US012727041B2

(12) United States Patent
Xu et al.

(10) Patent No.: US 12,727,041 B2
(45) Date of Patent: Sep. 1, 2026

(54) CROSS-LINK INTERFERENCE (CLI) MEASUREMENT BASED SIDELINK ESTABLISHMENT

(71) Applicant: QUALCOMM Incorporated, San Diego, CA (US)

(72) Inventors: Huilin Xu, Temecula, CA (US); Peng Cheng, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 18/001,808

(22) PCT Filed: Aug. 6, 2020

(86) PCT No.: PCT/CN2020/107343

§ 371 (c)(1),
(2) Date: Dec. 14, 2022

(87) PCT Pub. No.: WO2022/027416

PCT Pub. Date: Feb. 10, 2022

(65) Prior Publication Data

US 2023/0232472 A1 Jul. 20, 2023

(51) Int. Cl.
*H04W 76/14* (2018.01)
*H04B 17/345* (2015.01)
(Continued)

(52) U.S. Cl.
CPC .......... *H04W 76/14* (2018.02); *H04B 17/345* (2015.01); *H04W 76/11* (2018.02); *H04W 92/18* (2013.01)

(58) Field of Classification Search
CPC ..... H04W 76/14; H04W 76/11; H04W 92/18; H04W 72/25; H04B 17/345; H04L 5/0048; H04L 5/0094
See application file for complete search history.

(56) References Cited

U.S. PATENT DOCUMENTS 11,271,699 B1 * 3/2022 Eyuboglu ............ H04J 11/0073
2013/0303214 A1 * 11/2013 Ahmadi ............ H04W 72/1215 455/501
(Continued)

FOREIGN PATENT DOCUMENTS

CN 109219970 A 1/2019
CN 109391995 A 2/2019
(Continued)

OTHER PUBLICATIONS

Supplementary European Search Report—EP20948264—Search Authority—Berlin—Apr. 2, 2024.
(Continued)

*Primary Examiner* — Liem H. Nguyen
(74) *Attorney, Agent, or Firm* — Shumaker & Sieffert, P.A.

(57) ABSTRACT

This disclosure provides systems, methods and apparatus, including computer programs encoded on computer storage media, for establishing a sidelink connection between user equipment (UE). In some implementations, a first UE receives a cross-link interference (CLI) measurement configuration carrying an identifier that uniquely identifies a second UE for a CLI measurement, and selectively establishes a sidelink connection with the second UE using the identifier carried in the CLI measurement configuration.

22 Claims, 12 Drawing Sheets

(51) Int. Cl.
*H04W 76/11* (2018.01)
*H04W 92/18* (2009.01)

(56) References Cited

U.S. PATENT DOCUMENTS

2019/0261379 A1* 8/2019 Yerramalli ........... H04B 1/1027
2019/0363810 A1 11/2019 Luo et al.
2020/0229009 A1* 7/2020 Xu ...................... H04B 17/318
2020/0396703 A1* 12/2020 Luo .................. H04W 74/0833
2021/0006997 A1* 1/2021 Jin ........................ H04W 24/10
2021/0105789 A1* 4/2021 Freda .................... H04W 72/56
2021/0168805 A1* 6/2021 Koh ...................... H04W 76/14
2021/0377919 A1* 12/2021 Fong ..................... H04L 1/1861
2022/0006501 A1* 1/2022 Kim ...................... H04W 24/10
2022/0030522 A1* 1/2022 Vejlgaard ............ H04W 52/245
2022/0095240 A1* 3/2022 Ying .................... H04B 17/336
2022/0159596 A1* 5/2022 Kim ......................... H04J 11/00
2022/0224438 A1* 7/2022 Park .................. H04W 72/0446
2022/0247467 A1* 8/2022 Huang .................. H04W 72/23
2022/0256357 A1* 8/2022 Kim ...................... H04W 72/12
2022/0377822 A1* 11/2022 Wang .................... H04W 76/20
2023/0019994 A1* 1/2023 Wang .................... H04W 76/30
2023/0164602 A1* 5/2023 Kim ...................... H04W 24/10
370/252
2025/0008358 A1* 1/2025 Chen ..................... H04W 24/08

FOREIGN PATENT DOCUMENTS

CN 110637494 A 12/2019
CN 111278119 A 6/2020
WO 2018202144 A1 11/2018
WO 2020125931 A1 6/2020
WO 2020146891 A1 7/2020

OTHER PUBLICATIONS

International Search Report and Written Opinion—PCT/CN2020/107343—ISA/EPO—Apr. 29, 2021 8 pages.

Qualcomm Incorporated (Mediator): "Rel-17 IAB Email Discussion—Report", 3GPP TSG RAN meeting #86, RP-193094, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 8, 2019 (Dec. 8, 2019), 39 Pages, XP051838727, p. 13-p. 14.

* cited by examiner

CROSS-LINK INTERFERENCE (CLI) MEASUREMENT BASED SIDELINK ESTABLISHMENT

This application is a national stage application under 35 U.S.C. § 371 of PCT Application No. PCT/CN2020/107343, filed Aug. 6, 2020. The entire content of PCT Application No. PCT/CN2020/107343 is incorporated herein by reference as if fully set forth below in its entirety and for all applicable purposes.

CROSS-LINK INTERFERENCE (CLI) MEASUREMENT BASED SIDELINK ESTABLISHMENT

Technical Field

This disclosure relates generally to wireless communications and, more specifically, to establishing a sidelink connection with wireless communication devices.

Description of the Related Technology

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by the Third Generation Partnership Project (3GPP) to meet new requirements associated with latency, reliability, security, scalability, and other requirements. 5G NR includes services associated with enhanced mobile broadband (eMBB), massive machine type communications (mMTC), and ultra-reliable low latency communications (URLLC). There exists a need for further improvements in 5G NR technology. These improvements also may be applicable to other multi-access technologies and the telecommunication standards that employ these technologies.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method may be performed by a first user equipment (UE), and includes receiving a cross-link interference (CLI) measurement configuration carrying an identifier that uniquely identifies a second UE for a CLI measurement, and selectively establishing a sidelink connection with the second UE using the identifier carried in the CLI measurement configuration. The identifier can be any suitable identifier or value with which the first UE can address messages or signals to the second UE for establishing a sidelink connection with the second UE. In some instances, the identifier can be a user equipment identifier (UE ID).

The CLI measurement configuration can be received via a radio resource controller (RRC) configuration, and can carry a mapping between the UE ID and at least one of a cell radio network temporary identifier (C-RNTI), a temporary mobile station identifier (TMSI), an international mobile subscriber identity (IMSI), a medium access control (MAC) address, or any other suitable identity or address assigned to or otherwise associated with the second UE. The CLI measurement configuration can also indicate one or more CLI measurement resources on which the first UE is to measure the CLI associated with UL transmissions from the second UE. In some aspects, the CLI measurement configuration can indicate one or more of a periodicity, an offset, a number of resource blocks (RBs), or a number of orthogonal frequency-division multiplexing (OFDM) symbols corresponding to the CLI measurement resources over which the second UE is to transmit one or more CLI measurement signals.

In some implementations, the first UE can selectively establish the sidelink connection with the second UE based on a measurement metric of one or more CLI measurement signals received from the second UE. In some aspects, the method can also include receiving a CLI measurement signal from the second UE on the one or more indicated CLI measurement resources, determining a measurement metric of the received CLI measurement signal, and determining whether to establish the sidelink connection with the second UE based on the measurement metric of the CLI measurement signal relative to a value. In some instances, the first UE establishes the sidelink connection with the second UE when the measurement metric of the CLI measurement signal is greater than the value, and refrains from establishing the sidelink connection when the measurement metric of the CLI measurement signal is not greater than the value. The first UE can determine that the second UE is within a distance of the first UE based on the measurement metric of the CLI measurement signal being greater than the value. The first UE can also determine that the second UE is more than a distance from the first UE based on the measurement metric of the CLI measurement signal not being greater than the value.

The measurement metric can be any suitable metric, value, or characteristic from which the first UE can determine the strength or quality of the CLI measurement signal transmitted by the second UE. In some instances, the measurement metric can be a reference signal received power (RSRP) or a reference signal received quality (RSRQ), and the reference signal can be a sounding reference signal (SRS), an uplink demodulation reference signal (DM-RS), or a channel state information (C SI) reference signal (CSI-RS). The CLI measurement configuration can also indicate a reference signal received power-type measurement CLI procedure, and the CLI measurement signal can include one or more sets of SRS resources or DM-RS resources. In other instances, the measurement metric can be a received power measurement such as a received signal strength indicator (RSSI) of the CLI measurement signal. In some other instances, the measurement metric can be an interference measurement such as a signal to noise ratio (SNR) or a signal to interference plus noise ratio (SINR).

In other implementations, the first UE can selectively establish the sidelink connection with the second UE based on a presence of CLI on a downlink (DL) channel or transmission. In some aspects, the method can also include detecting CLI on the DL channel caused by uplink (UL) transmissions from the second UE, determining one or more dedicated resources associated with the second UE based at least in part on the identifier, and establishing the sidelink connection with the second UE on the one or more dedicated resources. In some instances, the first UE establishes the sidelink connection with the second UE when measurement metric of the DL channel is less than a value, and refrains from establishing the sidelink connection with the second UE when the measurement metric of the DL channel is not less than the value. In other instances, the first UE can establish the sidelink connection with the second UE when a power consumption associated with transmitting data to the second UE over the sidelink connection is less than a power consumption associated with transmitting data to a base station on an UL channel by at least a value. The first UE can also refrain from establishing the sidelink connection with the second UE when the power consumption associated with transmitting data to the second UE is not less than the power consumption associated with transmitting data to the base station by at least the value.

Another innovative aspect of the subject matter described in this disclosure can be implemented in a wireless communication device. In some implementations, the wireless communication device can be a first UE including at least one modem, at least one processor communicatively coupled with the at least one modem, and at least one memory communicatively coupled with the at least one processor. The memory can store instructions that, when executed by the at least one processor in conjunction with the at least one modem, causes the first UE to perform operations that include receiving a CLI measurement configuration carrying an identifier that uniquely identifies a second UE for a CLI measurement, and selectively establishing a sidelink connection with the second UE using the identifier carried in the CLI measurement configuration. The identifier can be any suitable identifier or value with which the first UE can address messages or signals to the second UE for establishing a sidelink connection with the second UE. In some instances, the identifier can be a UE ID.

The CLI measurement configuration can be received via a RRC configuration, and can carry a mapping between the UE ID and at least one of a C-RNTI, a TMSI, an IMSI, a MAC address, or any other suitable identity or address assigned to or otherwise associated with the second UE. The CLI measurement configuration can also indicate one or more CLI measurement resources on which the first UE is to measure the CLI associated with UL transmissions from the second UE. In some aspects, the CLI measurement configuration can indicate one or more of a periodicity, an offset, a number of RBs, or a number of OFDM symbols corresponding to the CLI measurement resources over which the second UE is to transmit one or more CLI measurement signals.

In some implementations, the first UE can selectively establish the sidelink connection with the second UE based on a measurement metric of one or more CLI measurement signals received from the second UE. In some aspects, execution of the instructions causes the first UE to perform operations that further include receiving a CLI measurement signal from the second UE on the one or more indicated CLI measurement resources, determining a measurement metric of the received CLI measurement signal, and determining whether to establish the sidelink connection with the second UE based on the measurement metric of the CLI measurement signal relative to a value. In some instances, the first UE establishes the sidelink connection with the second UE when the measurement metric of the CLI measurement signal is greater than the value, and refrains from establishing the sidelink connection when the measurement metric of the CLI measurement signal is not greater than the value. The first UE can determine that the second UE is within a distance of the first UE based on the measurement metric of the CLI measurement signal being greater than the value. The first UE can also determine that the second UE is more than a distance from the first UE based on the measurement metric of the CLI measurement signal not being greater than the value.

The measurement metric can be any suitable metric, value, or characteristic from which the first UE can determine the strength or quality of the CLI measurement signal transmitted by the second UE. In some instances, the measurement metric can be an RSRP or an RSRQ, and the reference signal can be an SRS, an UL DMRS, or a CSI-RS. The CLI measurement configuration can also indicate a reference signal received power-type measurement CLI procedure, and the CLI measurement signal can include one or more sets of SRS resources or DM-RS resources. In other instances, the measurement metric can be a received power measurement such as an RSSI of the CLI measurement signal. In some other instances, the measurement metric can be an interference measurement such as an SNR or SINR.

In other implementations, the first UE can selectively establish the sidelink connection with the second UE based on a presence of CLI on a DL channel or transmission. In some aspects, execution of the instructions causes the first UE to perform operations that further include detecting CLI on the DL channel caused by UL transmissions from the second UE, determining one or more dedicated resources associated with the second UE based at least in part on the identifier, and establishing the sidelink connection with the second UE on the one or more dedicated resources. In some instances, the first UE establishes the sidelink connection with the second UE when measurement metric of the DL channel is less than a value, and refrains from establishing the sidelink connection with the second UE when the measurement metric of the DL channel is not less than the value. In other instances, the first UE can establish the sidelink connection with the second UE when a power consumption associated with transmitting data to the second UE over the sidelink connection is less than a power consumption associated with transmitting data to a base station on an UL channel by at least a value. The first UE can also refrain from establishing the sidelink connection with the second UE when the power consumption associated with transmitting data to the second UE is not less than the power consumption associated with transmitting data to the base station by at least the value.

Another innovative aspect of the subject matter described in this disclosure can be implemented in a wireless communication device. In some implementations, the wireless communication device can be a first UE that includes means for receiving a CLI measurement configuration carrying an identifier that uniquely identifies a second UE for a CLI measurement, and means for selectively establishing a sidelink connection with the second UE using the identifier carried in the CLI measurement configuration. The identifier can be any suitable identifier or value with which the first UE can address messages or signals to the second UE for establishing a sidelink connection with the second UE. In some instances, the identifier can be a UE ID.

The CLI measurement configuration can be received via a RRC configuration, and can carry a mapping between the UE ID and at least one of a C-RNTI, a TMSI, an IMSI, a MAC address, or any other suitable identity or address assigned to or otherwise associated with the second UE. The CLI measurement configuration can also indicate one or more CLI measurement resources on which the first UE is to measure the CLI associated with UL transmissions from the second UE. In some aspects, the CLI measurement configuration can indicate one or more of a periodicity, an offset, a number of RBs, or a number of OFDM symbols corresponding to the CLI measurement resources over which the second UE is to transmit one or more CLI measurement signals.

In some implementations, the first UE can selectively establish the sidelink connection with the second UE based on a measurement metric of one or more CLI measurement signals received from the second UE. In some aspects, the first UE can also include means for receiving a CLI measurement signal from the second UE on the one or more indicated CLI measurement resources, means for determining a measurement metric of the received CLI measurement signal, and means for determining whether to establish the sidelink connection with the second UE based on the measurement metric of the CLI measurement signal relative to a value. In some instances, the first UE establishes the sidelink connection with the second UE when the measurement metric of the CLI measurement signal is greater than the value, and refrains from establishing the sidelink connection when the measurement metric of the CLI measurement signal is not greater than the value. The first UE can determine that the second UE is within a distance of the first UE based on the measurement metric of the CLI measurement signal being greater than the value. The first UE can also determine that the second UE is more than a distance from the first UE based on the measurement metric of the CLI measurement signal not being greater than the value.

The measurement metric can be any suitable metric, value, or characteristic from which the first UE can determine the strength or quality of the CLI measurement signal transmitted by the second UE. In some instances, the measurement metric can be an RSRP or an RSRQ, and the reference signal can be an SRS, an UL DMRS, or a CSI-RS. The CLI measurement configuration can also indicate a reference signal received power-type measurement CLI procedure, and the CLI measurement signal can include one or more sets of SRS resources or DM-RS resources. In other instances, the measurement metric can be a received power measurement such as an RSSI of the CLI measurement signal. In some other instances, the measurement metric can be an interference measurement such as an SNR or SINR.

In other implementations, the first UE can selectively establish the sidelink connection with the second UE based on a presence of CLI on a DL channel or transmission. In some aspects, the first UE can include means for detecting CLI on the DL channel caused by UL transmissions from the second UE, means for determining one or more dedicated resources associated with the second UE based at least in part on the identifier, and means for establishing the sidelink connection with the second UE on the one or more dedicated resources. In some instances, the first UE establishes the sidelink connection with the second UE when measurement metric of the DL channel is less than a value, and refrains from establishing the sidelink connection with the second UE when the measurement metric of the DL channel is not less than the value. In other instances, the first UE can establish the sidelink connection with the second UE when a power consumption associated with transmitting data to the second UE over the sidelink connection is less than a power consumption associated with transmitting data to a base station on an UL channel by at least a value. The first UE can also refrain from establishing the sidelink connection with the second UE when the power consumption associated with transmitting data to the second UE is not less than the power consumption associated with transmitting data to the base station by at least the value.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
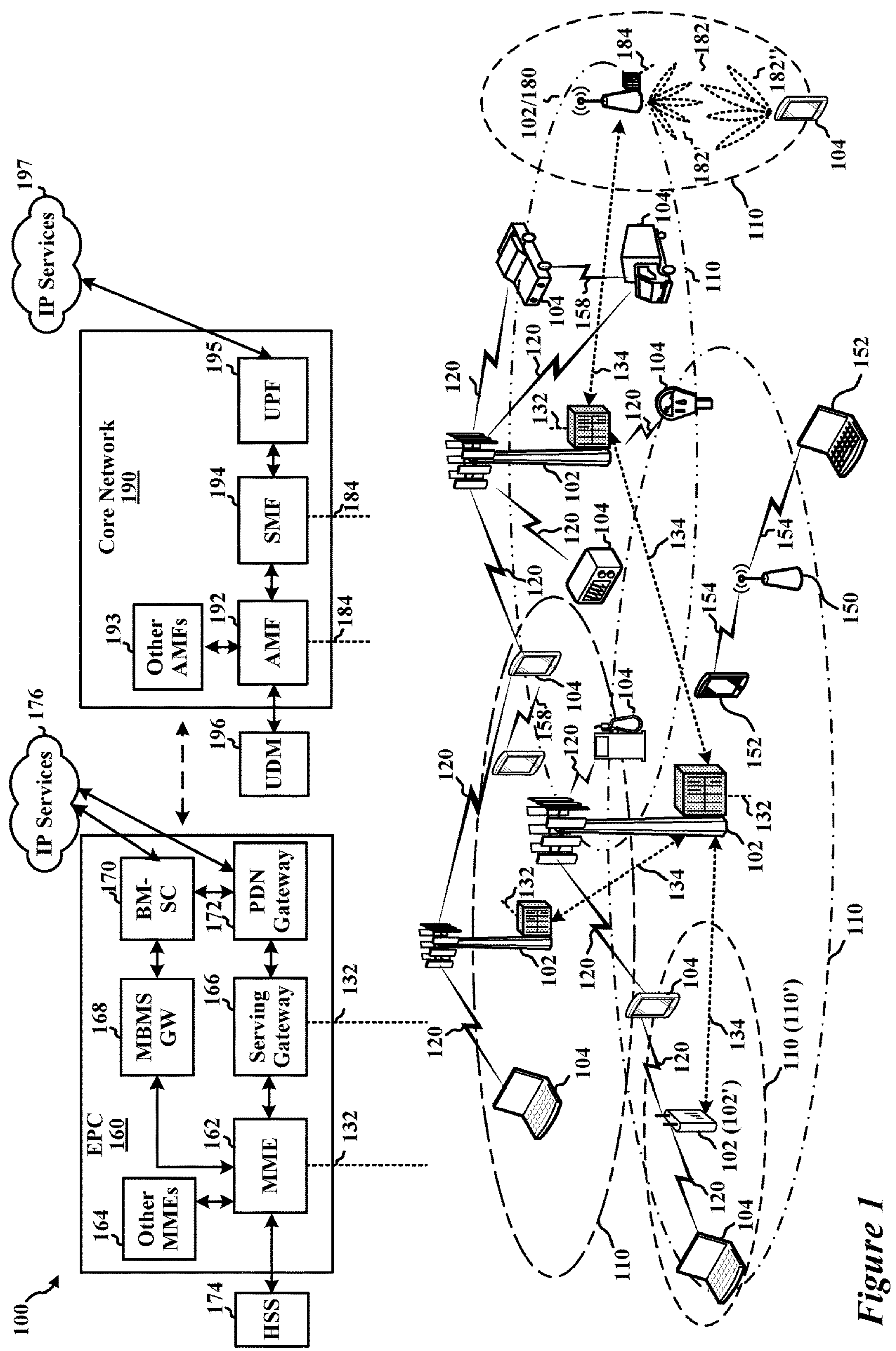
FIG. 1 shows a diagram illustrating an example wireless communications system.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (TOT) network.

Implementations of the subject matter described in this disclosure may allow UEs to establish sidelink connections with other UEs based on a presence of cross-link interference (CLI) between UEs or on information carried in a CLI measurement configuration. In accordance with various aspects of the present disclosure, a first UE can receive a CLI measurement configuration carrying an identifier that uniquely identifies a second UE for a CLI measurement. The first UE can use the identifier to selectively establish a sidelink connection with the second UE based on one or more of a measurement metric of a CLI measurement signal received from the second UE, a measurement metric of a DL channel between the first UE and a base station, a level of CLI on the DL channel, a level of power consumption associated with transmitting data to the second UE on the sidelink connection, or a level of power consumption associated with transmitting data to the base station on an UL channel. In some instances, the identifier can be a UE ID.

The measurement metric can include one or more of an RSRP, an RSRQ, an RSSI, an SNR, or an SINR. In some instances, the measurement metric can be indicated in the CLI measurement configuration. In some other instances, the CLI measurement configuration can indicate one or more of the CLI measurement resources on which the first UE is to receive the CLI measurement signals, the CLI measurement resources on which the first UE is to measure the CLI associated with UL transmissions from the second UE, or at least one of the periodicity, the offset, the RBs, or the OFDM symbols corresponding to the CLI measurement resources.

In some instances, the first UE can establish the sidelink connection with the second UE when the measurement metric determined for one or more CLI measurement signals is greater than a value, or can refrain from establishing the sidelink connection with the second UE when the determined measurement metric is not greater than the value. In other instances, the first UE can establish the sidelink connection with the second UE when a measurement metric of the DL channel is less than a value, or can refrain from establishing the sidelink connection with the second UE when the measurement metric of the DL channel is not less than the value. In some other instances, the first UE can establish the sidelink connection with the second UE when a power consumption associated with transmitting data to the second UE over the sidelink connection is less than a power consumption associated with transmitting data to the base station on the UL channel by at least a value.

Particular implementations of the subject matter described in this disclosure can be implemented to realize one or more of the following potential advantages. By allowing the first UE to determine whether to establish a sidelink connection with the second UE based on a presence of CLI, on measurement metrics of CLI measurement signals or DL channels, or on the power consumption associated with transmissions on potential sidelink connections, the first UE can maintain a connection with the base station via the sidelink connection and the second UE when the first UE is no longer within the coverage area of the base station. In this way, the coverage area provided for the first UE by the base station can be effectively extended by the first UE, for example, without assistance from the base station or without changing or modifying operating parameters of the base station. This can be particularly important when the first UE has limited capabilities, such as a reduced-capacity (RedCap) UE or a bandwidth reduced low complexity UE (BL UE), and may fall outside the coverage area of a base station while other nearby UEs (such as the second UE) remain within the coverage area of the base station.

Among other advantages, allowing the first UE to select or determine the aforementioned values can ensure that at least one of the signal strength, signal quality, or channel conditions of the sidelink connection to be established with another UE is better than the respective signal strength, signal quality, or channel conditions of access channels between the first UE and the base station. In this way, the first UE can increase the likelihood that a particular sidelink connection with another UE can be used to effectively extend the coverage area provided for the first UE.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100. The wireless communications system 100, which may be a Next Generation RAN (NG-RAN), includes base stations 102, UEs 104, an Evolved Packet Core (EPC) 160, and another core network 190. The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 via 51 interfaces, and the base stations 102 configured for 5G NR may interface with the core network 190 through backhaul links 184 via N2 and N3 interfaces. The base stations 102 may communicate with one another through one or more backhaul links 134 via X2 interfaces. The base stations 102 may perform a number of functions including (but not limited to) the transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages.

Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG).

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 404 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

The wireless communications system may further include a Wi-Fi access point (AP) 150 in communication with Wi-Fi stations (STAs) 152 via communication links 154 in a 2.4 GHz unlicensed frequency spectrum, a 5 GHz unlicensed frequency spectrum, or both. When communicating in an unlicensed frequency spectrum, the STAs 152 and the AP 150 may perform a clear channel assessment (CCA) prior to communicating in order to determine whether the channel is available.

A given base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or the core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some UEs 104 may be referred to as IoT devices (such as a parking meter, gas pump, toaster, vehicles, heart monitor, etc.). Other UEs 104 may be referred to as cellular IoT (CIoT) devices (such as a smartphone capable of narrowband communications based on one or more designed for IoT devices). A UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A base station 102, whether a small cell 102' or a large cell (such as a macro base station), may include an eNB, gNodeB (gNB), or another type of base station. Some base stations, such as gNB 180, may operate in a traditional sub-6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum.

EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW or near mmW radio frequency band (such as between 3 GHz-300 GHz) has extremely high path loss and a short range. The mmW base station 180 may utilize beamforming 182 with the UE 104 to compensate for the extremely high path loss and short range. Beamforming, which may also be referred to as spatial filtering, directional transmission, or directional reception, is a signal processing technique that may be used at a transmitting device or a receiving device (such as a base station 102 or a UE 104) to shape or steer an antenna beam along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

For example, the base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The base stations 102 and the UEs 104 may wirelessly communicate with each other via one or more communication links 120 using one or more carriers. The term "carrier" may refer to a set of radio frequency spectrum resources having a defined physical layer structure for supporting the communication links 120. For example, a carrier used for a communication link 120 may include a portion of a radio frequency spectrum band (such as a bandwidth part (BWP)) that is operated according to physical layer channels for a given radio access technology. Each physical layer channel may carry acquisition signaling (such as synchronization signals, system information), control signaling that coordinates operation for the carrier, user data, or other signaling. The wireless communications system 100 may support communications between the base station 102 and the UEs 104 using carrier aggregation or multi-carrier operation. Carrier aggregation may be used with both frequency division duplexing (FDD) and time division duplexing (TDD) component carriers. Allocation of carriers may be asymmetric with respect to the DL and UL channels, for example such that the UL and DL channels may include different numbers of carriers. The component carriers may include a primary component carrier and one or more secondary component carriers. A primary component carrier may be referred to as a primary cell (PCell), and a secondary component carrier may be referred to as a secondary cell (SCell).

In some examples, a carrier may support multiple cells, and different cells may be configured according to different protocol types (such as MTC, NB-IoT, enhanced mobile broadband (eMBB), or others) that may provide access for different types of devices.

The communication links 120 may include uplink (UL) transmissions from a UE 104 to a base station 102 or downlink (DL) transmissions from a base station 102 to a UE 104. The communication links 120 may use multiple-input and multiple-output (MIMO) antenna technology, for example, to provide spatial multiplexing, beamforming, or transmit diversity. The base stations 102 and UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other.

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

Some UEs 104, such as MTC or IoT devices, may be low cost or low complexity devices and may provide for automated communication between machines (such as by using Machine-to-Machine (M2M) communication). M2M communication or MTC may refer to data communication technologies that allow devices to communicate with one another or a base station 102 without human intervention. In some examples, M2M communication or MTC may include communications from devices that integrate sensors or meters to measure or capture information and relay such information to a central server or application program that makes use of the information or presents the information to humans interacting with the application program. Some UEs 104 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 104 and a base station 102 or EPC 160 supporting radio bearers for user plane data. At the Physical layer, transport channels may be mapped to physical channels.

The EPC 160 may provide user authentication, access authorization, tracking, Internet Protocol (IP) connectivity, and other access, routing, or mobility functions. In some implementations, the EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 is a control plane entity that manages access and mobility, and may be in communication with a Home Subscriber Server (HSS) 174. The MME 162 may manage non-access stratum (NAS) functions such as mobility, authentication, and bearer management for UEs 104 served by base stations 104 associated with the EPC 160, and may process the signaling between the UEs 104 and the EPC 160. All user IP packets are transferred through the Serving Gateway 166, which is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, one or more other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User IP packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

Referring again to FIG. 1, in certain aspects, the base station 102/180 may be configured to select a beam for transmitting DL data to a UE 104 based on one or more of RSRP levels of reference signals received by the UE 104, delay spread values of reference signals received by the UE 104, SINR values of reference signals received by the UE 104, and/or a number of settings or capabilities of equalizers used by the UE 104 for equalizing channel delay spread associated with data received from the base station.

Figures 2A, 2B, 2C, 2D:
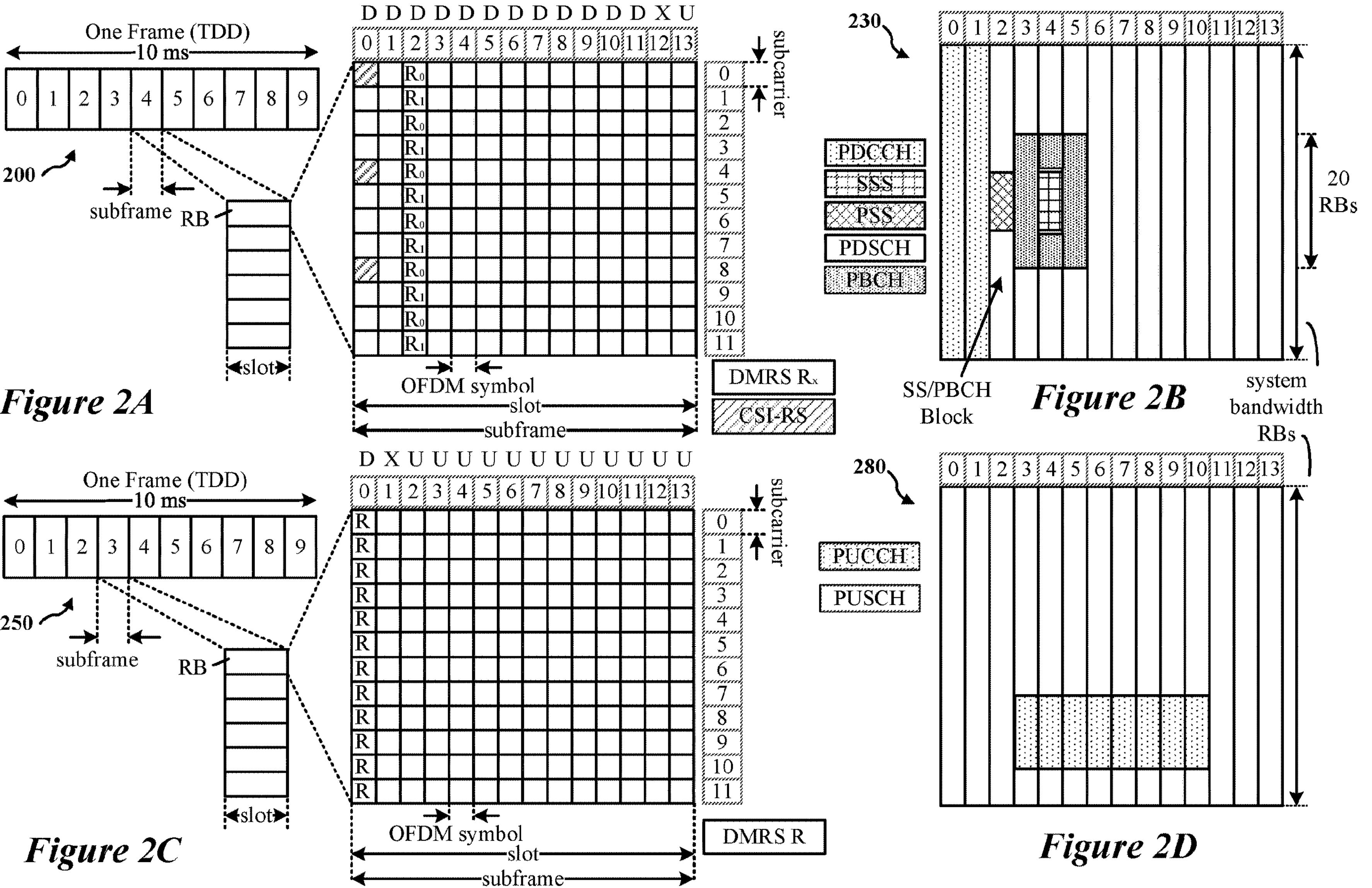
FIG. 2A shows an example of a first 5G NR frame.
FIG. 2B shows example downlink (DL) channels within a 5G NR slot.
FIG. 2C shows an example of a second 5G NR frame.
FIG. 2D shows example uplink (UL) channels within a 5G NR slot.

FIG. 2A shows an example of a first slot 200 within a 5G NR frame structure. FIG. 2B shows an example of DL channels 230 within a 5G NR slot. FIG. 2C shows an example of a second slot 250 within a 5G NR frame structure. FIG. 2D shows an example of UL channels 280 within a 5G NR slot. In some instances, the 5G NR frame structure may be FDD in which, for a particular set of subcarriers (carrier system bandwidth), slots within the set of subcarriers are dedicated for either DL or UL transmissions. In some other instances, the 5G NR frame structure may be TDD in which, for a particular set of subcarriers (carrier system bandwidth), slots within the set of subcarriers are dedicated for both DL and UL transmissions. In the examples shown in FIGS. 2A and 2C, the 5G NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G NR frame structure that is based on FDD.

Other wireless communication technologies may have a different frame structure or different channels. A frame may be divided into a number of equally sized subframes. For example, a frame having a duration of 10 milliseconds (ms) may be divided into 10 equally sized subframes each having a duration of 1 ms. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols per slot and 2 $\mu$ slots per subframe. The subcarrier spacing and symbol length/duration are a function of the numerology. The subcarrier spacing may be equal to 2 * 15 kHz, where $\mu$ is the numerology 0 to 5. As such, the numerology $\mu$=0 has a subcarrier spacing of 15 kHz, and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 microseconds ($\mu$s).

A resource grid may be used to represent the frame structure. Each time slot includes a resource block (RB) (also referred to as a physical RB (PRB)) that extends across 12 consecutive subcarriers and across a number of symbols.

The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
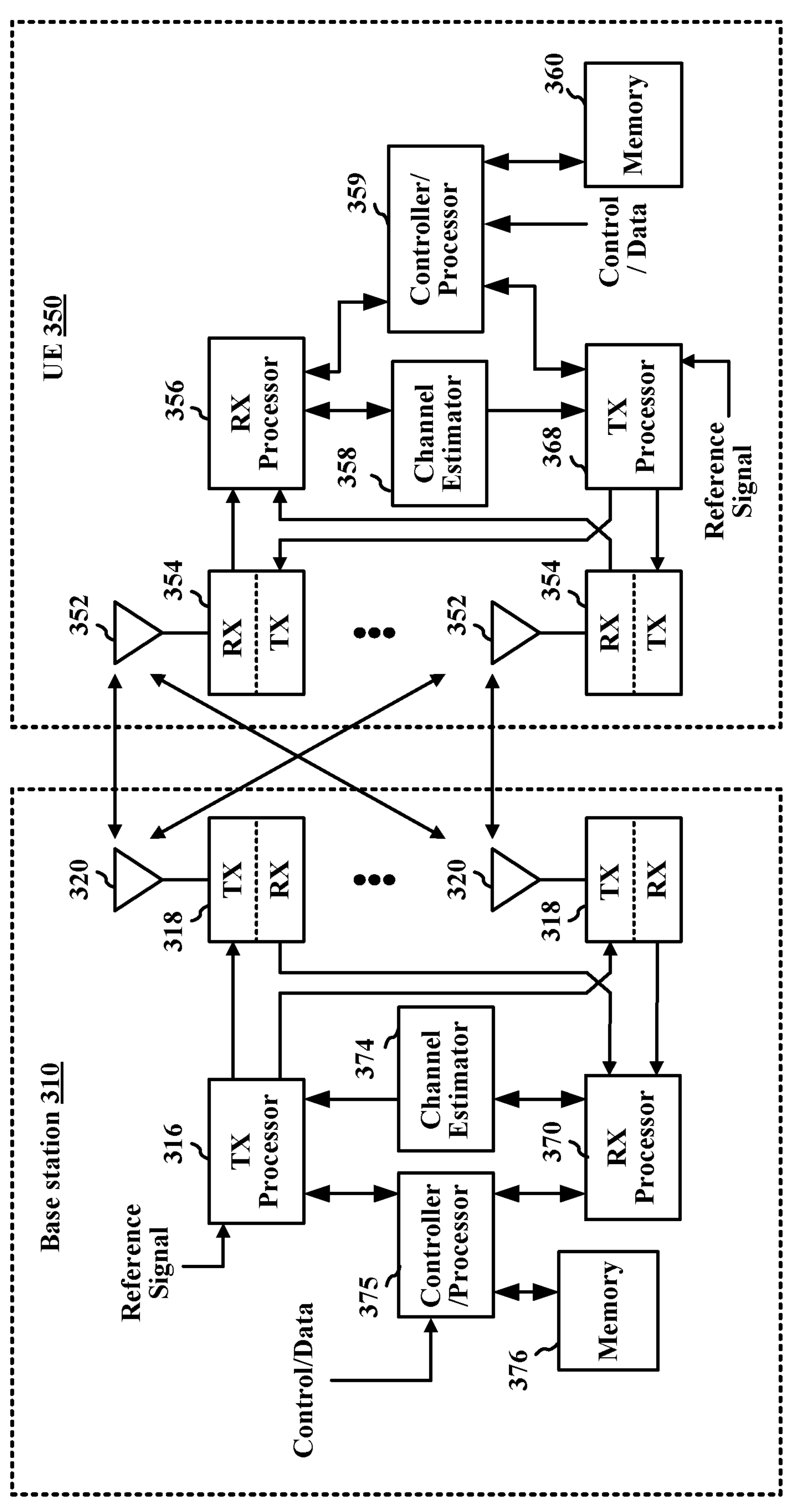
FIG. 3 shows a diagram illustrating an example base station and user equipment (UE) in an access network.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as the MIB and SIGs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as the MIB and SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. However, in some other implementations, the UE 350 may include fewer transmitters (or transmit chains) than receive (RX) antennas. Although not shown for simplicity, each transmitter may be coupled to a respective power amplifier (PA) which amplifies the signal to be transmitted. The combination of a transmitter and a PA may be referred to herein as a "transmit chain" or "TX chain." To save on cost or die area, the same PA may be reused to transmit signals over multiple RX antennas. In other words, one or more TX chains of a UE may be selectively coupled to multiple RX antennas ports.

Figure 4:
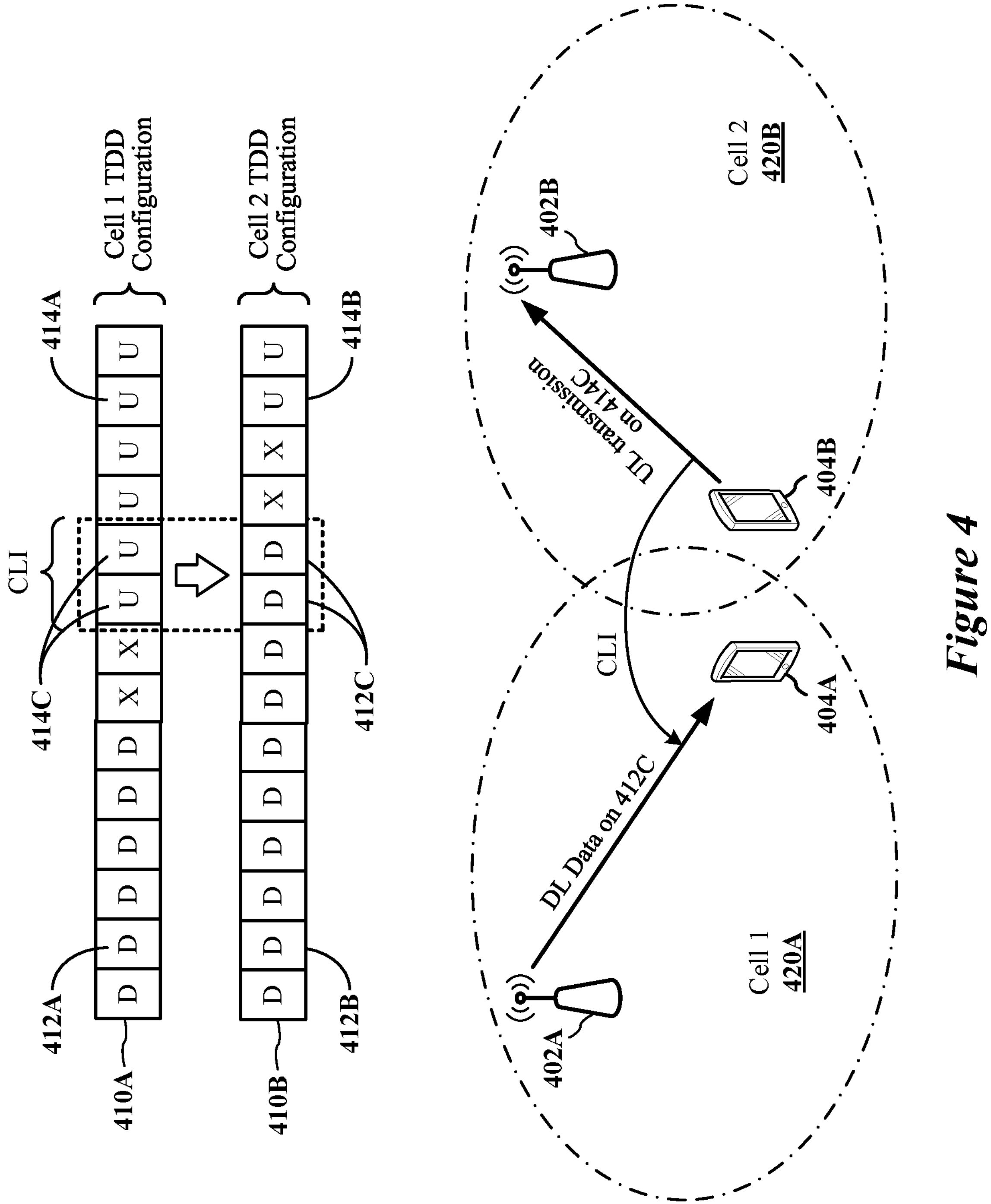
FIG. 4 shows an illustration depicting an example UL/DL time division duplexing (TDD) transmission scheme that supports cross-link interference (CLI) measurements.

FIG. 4 shows an illustration 400 depicting an example UL/DL time division duplexing (TDD) transmission scheme that supports cross-link interference (CLI) measurements, according to some implementations. The TDD transmission scheme can be implemented in a wireless communications system that includes a first base station 402A, a second base station 402B, a first UE 404A, and a second UE 404B. The first base station 402A can be any base station, access node, access terminal, TRP, or network entity that can provide wireless signal coverage for its corresponding cell 420A. Similarly, the second base station 402B can be any base station, access node, access terminal, TRP, or network entity that can provide wireless signal coverage for its corresponding cell 420B. In some instances, the first base station 402A and the second base station 402B can be the same base station. The first UE 404A and the second UE 404B can any suitable wireless communication device such as the UE 104 of FIG. 1 or the UE 350 of FIG. 3. In some implementations, the first UE 404A may be designated as a victim UE, and the second UE 404B may be designated as an aggressor UE.

The wireless communications system can employ TDD communications to allow UL and DL transmissions on a shared wireless medium. In some implementations, each of the base stations 402A and 402B can determine a TDD configuration for its corresponding cell. For example, the first base station 402A can select or determine a first TDD configuration 410A for use in corresponding cell 410A, and the second base station 402B can select or determine a second TDD configuration 410B for use in corresponding cell 410B. The TDD configurations 410A and 410B can be cell-specific, UE-specific, or a mixture of both. Each of the TDD configurations 410A and 410B can include one or more downlink "D" symbols 412, one or more uplink "U" symbols 414, and/or one or more flexible "X" symbols 416. That is, the slot represented by each of the TDD configurations 410A and 410B can include one or more symbol periods for DL symbols, one or more symbol periods for UL symbols, and/or one or more symbol periods for flexible symbols.

The base stations 402A and 402B can transmit DL data in one or more DL symbols 412 of respective TDD configurations 410A and 410B, and the UEs 404A and 404B can transmit UL data in one or more UL symbols 414 of respective TDD configurations 410A and 410B. In some instances, the flexible symbols 416 can be used as guard periods between UL and DL transmissions configured by the TDD configurations 410A and 410B. The guard periods can prevent inter-symbol interference (ISI), and can also provide additional time for UEs (such as UEs 404A and 404B) to adjust radio frequencies when switching between receiving DL data and transmitting UL data. In some instances, the flexible symbols 416 can be converted to UL or DL symbols based on higher layer configurations (such as provided by RRC signaling) or dynamic configurations (such as provided by DCI messages).

The use of TDD configurations 410A and 410B by respective base stations 402A and 402B can lead to concurrent UL and DL transmissions in the same symbol period(s) of a slot, which in turn can cause collisions on the wireless medium. For example, the two UL symbols 414C in the first TDD configuration 410A overlap in time, yet have different transmit directions, than the two DL symbols 412C in the second TDD configuration 410B. In the example of FIG. 4, the cells 420A and 420B are neighboring cells, and the first UE 404A is relatively close to the second UE 404B (such as less than a distance apart from one another). The relative proximity of the UEs 404A and 404B to one another may increase the likelihood that UL uplink transmissions from the second UE 404B interfere with concurrent receptions of DL data by the first UE 404A.

This type of interference is commonly referred to as cross-link interference (CLI). For example, UL transmissions from the second UE 404B using UL symbols 414C can cause CLI to appear in DL data transmitted to the first UE 404A using the DL symbols 412C. In some instances, a UE can use the amount of CLI resulting from the UL transmission as an indicator of the signal strength, integrity, and/or power level of a candidate channel over which to establish a sidelink connection with the second UE 404B. In other instances, the UE can use the amount of CLI resulting from the UL transmission as an indicator of the signal strength, integrity, and/or power level of signals or messages transmitted from the second UE 404B.

The amount of cross-link interference on the DL channel resulting from UL transmissions from the second UE 404B can be used by the first UE 404A to determine whether to establish a sidelink connection with the second UE 604B. In some implementations, signals transmitted by the second UE 404B using the UL symbols 414C can appear as CLI to the first UE 404A. The first UE 404A can receive these signals based on a CLI measurement configuration. The first UE 404A can also determine a measurement metric (such as an RSRP, an RSRQ, or an RSSI value) of these signals. In some instances, the base station 402 can schedule resources for sidelink communication between the first UE 404A and the second UE 404B. For example, the base station 402 may transmit a PDCCH carrying a generic grant for sidelink communication or a link-specific grant for sidelink communication.

Figure 5A:
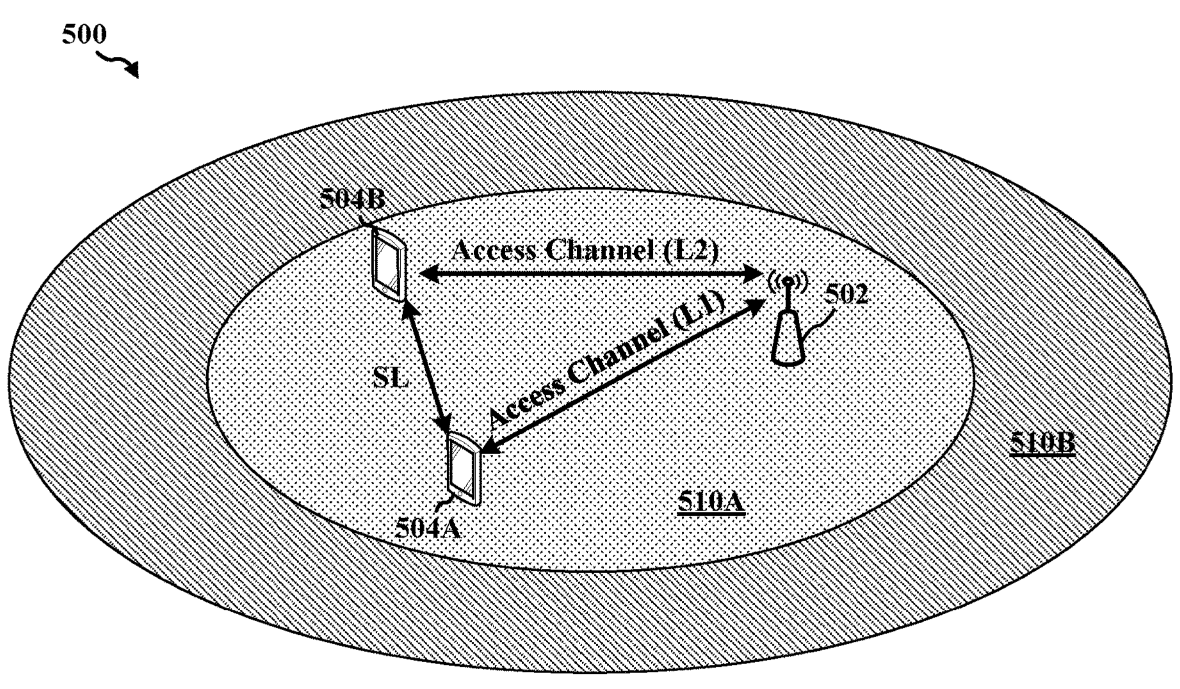
FIG. 5A shows an illustration depicting an example coverage area of a base station, according to some implementations.

FIG. 5A shows an illustration 500 depicting an example coverage area of a base station, according to some implementations. The illustration 500 shows a base station 502, a first UE 504A, and a second UE 504B. The base station 502 can exchange data and information with the first UE 504A on a first access channel or link (L1), and can exchange data and information with the second UE 504B on a second access channel or link (L2). Also shown is a first coverage area 510A corresponding to the first access channel (L1), and a second coverage area 510A corresponding to the second access channel (L2). In the example of FIG. 5A, the first UE 504A is operating within the first coverage area 510A, and the second UE 504B is operating within the second coverage area 510B (which is shown to include the first coverage area 510A). The access channels L1 and L2 may provide sufficient communication links between the base station 502 and respective UEs 504A and 504B, or may provide better communication links than a potential sidelink connection between the UEs 504A and 504B, and there may not be any performance advantages associated with establishing a sidelink connection. Under these conditions, the first UE 504A may refrain from establishing a sidelink connection with the second UE 504B.

Figure 5B:
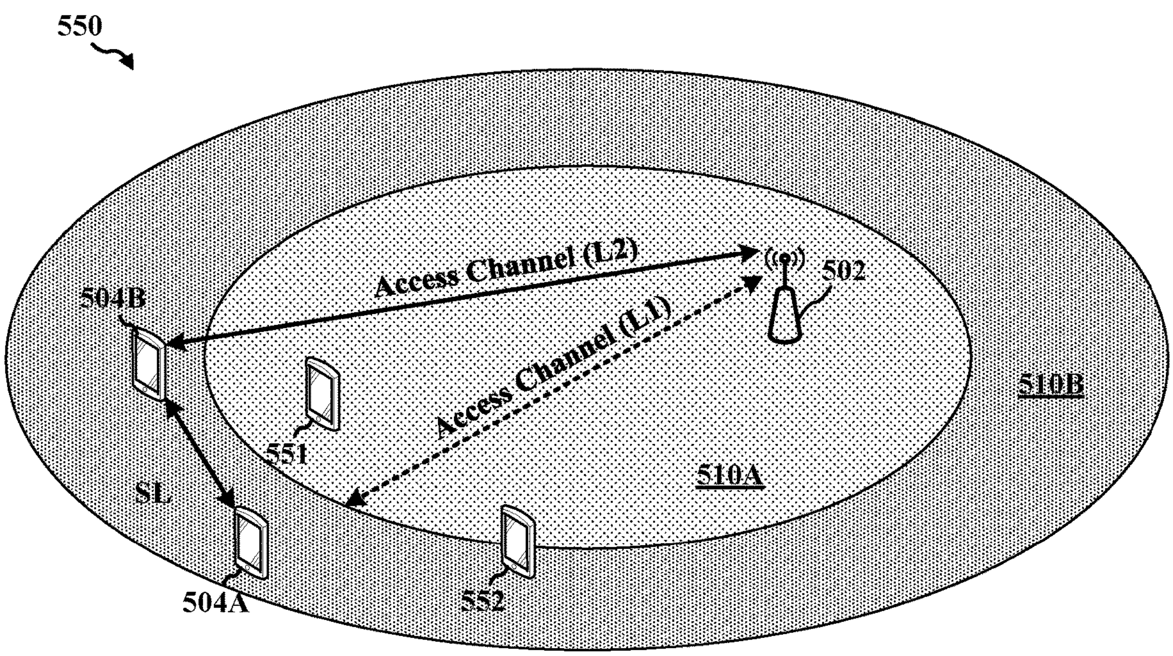
FIG. 5B shows an illustration depicting another example coverage area of a base station, according to some implementations.

FIG. 5B shows an illustration 550 depicting another example coverage area of the base station, according to some implementations. The illustration 550 depicts the first UE 504A no longer operating within the first coverage area 510A, and depicts the second UE 504B as no longer within the first coverage area 510A but remaining within the second coverage area 510B. In some instances, the first UE 504A may no longer have an RRC connection with the base station 502 when not operating within the first coverage area 510A. For implementations in which the first UE 504A is a reduced capability (RedCap) UE, a bandwidth reduced low complexity UE (BL UE), an eMTC device, or an NB-IoT device, the limited capabilities, reduced antenna size, and/or fewer number of antennas of the first UE 504A (such as relative to the second UE 504B) may cause the first UE 504A to fall out of its coverage area 510A while nearby UEs remain within their respective coverage areas.

In accordance with some aspects of the present disclosure, the first UE 504A can use power measurements of DL transmissions from the base station 502 to determine whether the sidelink connection is likely to provide a better communications medium for the first UE 504A than access channels (such as the PDSCH, PDCCH, PUSCH, PUCCH, and so on) provided by the base station 502. In some instances, the first UE 504A can use the sidelink connection as a relay to exchange data and other information with the base station 502 via the second UE 504B. In addition, or in the alternative, the first UE 504A can off-load one or more processing functions to the second UE 504B.

The first UE 504A can also measure the CLI of other UEs 551-552, and use the measured CLI information to identify which of the other UEs 551-552 would most likely provide the highest quality sidelink channel with the first UE 504A. In some instances, the first UE 504A can establish the sidelink connection with the identified other UE. In other instances, the first UE 504A can use one or more measurement metrics determined for each of the other UEs 551-552 to predict or estimate the quality of a potential sidelink connection with a respective one of the other UEs 551-552.

Figure 6A:
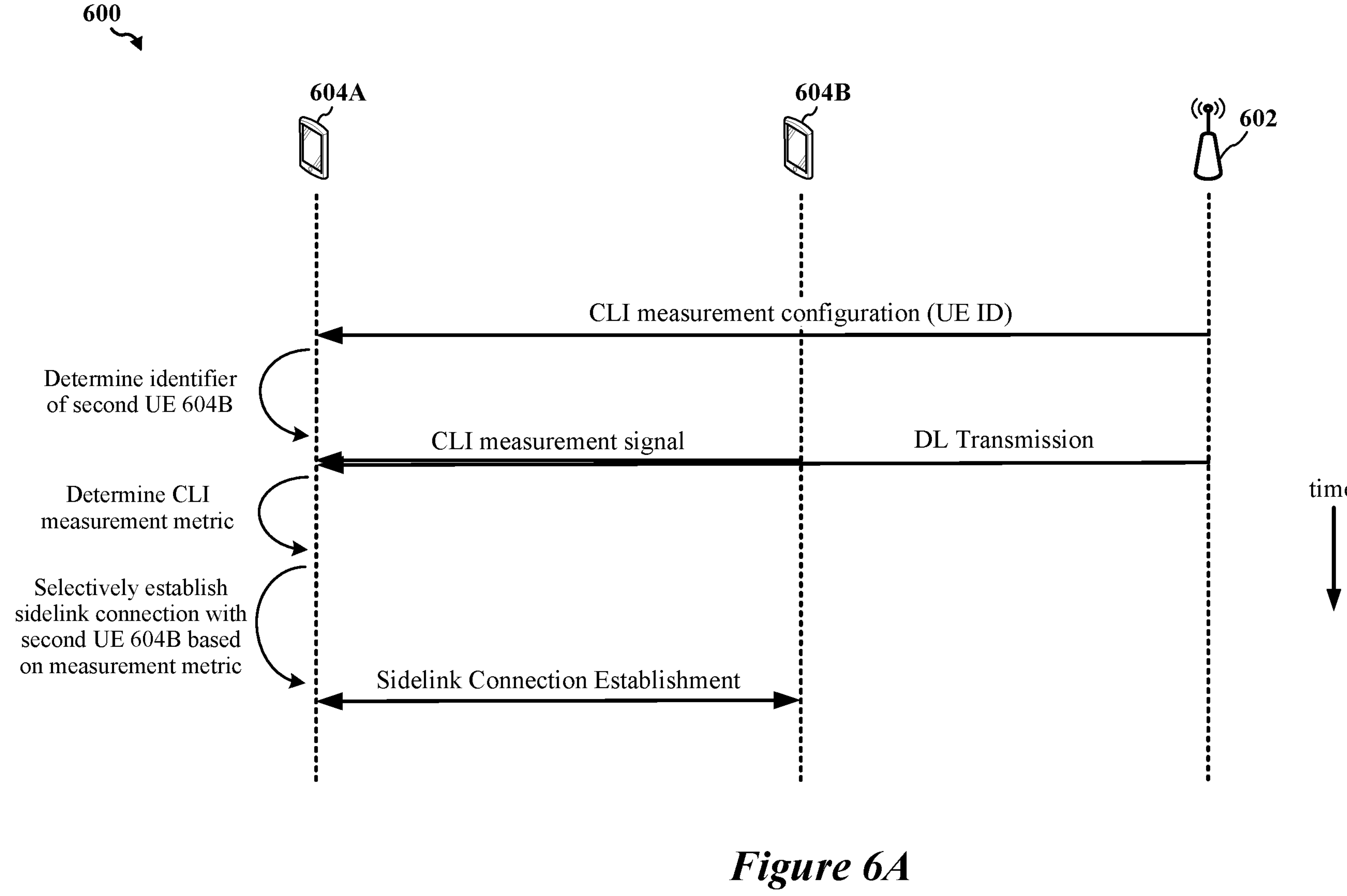
FIG. 6A shows a sequence diagram for wireless communication that supports establishing sidelink channels, according to some implementations.

FIG. 6A shows a sequence diagram 600 depicting an example message exchange between a base station 602, a first UE 604A, and a second UE 604B that supports establishing sidelink channels, according to some implementations. The base station 602 may be one example of the base station 102 of FIG. 1 or the base station 310 of FIG. 3, the first UE 604A may be one example of the UE 104 of FIG. 1, the UE 350 of FIG. 3, or the first UE 504A of FIGS. 5A and 5B, and the second UE 604B may be one example of the UE 104 of FIG. 1, the UE 350 of FIG. 3, or the second UE 504B of FIGS. 5A and 5B. In some instances, the first UE 604A and the second UE 604B may be served by the base station 602. In other instances, one of the first UE 604A and the second UE 604B may be served by the base station 602, and the other of the first UE 604A and the second UE 604B may be served by another base station (not shown for simplicity) associated with a different cell or tracking area than the base station 602.

The first UE 604A receives a cross-link interference (CLI) measurement configuration carrying an identifier that uniquely identifies the second UE 604B for one or more CLI measurement procedures. In some instances, the first UE 604A can receive the CLI measurement configuration via RRC signaling. The first UE 604A determines the identifier of the second UE 604B, which can be used to address messages and signals to the second UE 604B. In some instances, the first UE 604A can use the identifier as the destination address of a ready-to-send (RTS) message that, when transmitted to the second UE 604B, can be used to establish the sidelink connection. The second UE 604B can receive the RTS message, and can send a clear-to-send (CTS) message to the first UE 604A. The CTS message can also notify other nearby wireless communication devices that a channel associated with the sidelink connection is busy. The sidelink channel can include a physical sidelink synchronization channel (PSSCH), a physical sidelink broadcast channel (PSBCH), or a physical sidelink control channel (PSCCH).

The CLI measurement configuration can also indicate the CLI measurement resources on which the first UE 604A is to measure the CLI associated with UL transmissions from the second UE 604B. For example, the CLI measurement configuration can indicate a periodicity, an offset, a number of RBs, or a number of OFDM symbols corresponding to the indicated CLI measurement resources. In some instances, the second UE 604B can also receive the CLI measurement configuration, or at least indications of the CLI measurement resources on which the second UE 604B is to transmit the CLI measurement signals.

As discussed, the identifier can be any suitable identifier or value with which the first UE 604A can address messages or signals to the second UE 604B. For example, the identifier can be a UE ID assigned to the second UE 604B by a core network (not shown for simplicity) associated with the base station 602. In some instances, the CLI measurement configuration carries a mapping between the UE ID of the second UE 604B and a cell radio network temporary identifier (C-RNTI), a temporary mobile station identifier (TMSI), an international mobile subscriber identity (IMSI), a medium access control (MAC) address, or another suitable identity or address assigned to or otherwise associated with the second UE 604B.

The second UE 604B transmits a CLI measurement signal on the one or more CLI measurement resources (such as indicated by the CLI measurement configuration). The CLI measurement resources can be configured to occupy a number of slots, RBs, and/or OFDM symbols used by the base station 602 for DL transmissions to the first UE 604A, for example, so that the first UE 604A receives the CLI measurement signals while concurrently receiving at least a portion of a DL transmission from the base station 602.

The first UE 604A receives the CLI measurement signal, and determines a measurement metric of the received CLI measurement signal. The measurement metric can be one or more of a reference signal received power (RSRP), a reference signal received quality (RSRQ), a received signal strength indicator (RS SI), a signal to noise ratio (SNR), or a signal-to-interference plus noise ratio (SINR) of the CLI measurement signal. In some aspects, the first UE 604A may determine the SINR of a signal or transmission according to procedures specified in one or more of the 3GPP releases. In some instances, the measurement metric can be an RSRP or an RSRQ of an UL reference signal such as, for example, a sounding reference signal (SRS), an uplink demodulation reference signal (DM-RS), or a channel state information (C SI) reference signal (CSI-RS). The SRS signal can be a set of SRS resources, and the UL DMRS signal can be a set of DM-RS resources. If an RSRP measurement is configured by CLI measurement configuration, the CLI measurement configuration can also indicate the SRS resources to be measured by the first UE 604A. In other instances, the measurement metric can be an RSSI value of the CLI measurement signal The first UE 604A can use the identifier carried in the CLI measurement configuration to selectively establish a sidelink connection with the second UE 604B based at least in part on the determined measurement metric of the CLI measurement signal. In some instances, the first UE 604A uses the identifier to establish a sidelink connection with the second UE 604B when the determined measurement metric is greater than a value, and does not establish (or refrains from establishing) the sidelink connection with the second UE 604B when the measurement metric of the CLI measurement signal is not greater than the value.

In accordance with some aspects of the present disclosure, selection or determination of the value can ensure that the signal strength, signal quality, and/or channel conditions of the sidelink connection to be established with the second UE 604B is greater or better than a threshold. The threshold can be selected to have a value such that the first UE 604A can ensure (or at least increase the likelihood) that the sidelink connection with the second UE 604B provides better coverage, higher throughput, lower latencies, and/or greater signal quality than an UL access channel (such as the PUSCH) with the base station 602.

In some instances, the first UE 604A can determine that the second UE 604B is within a distance of the first UE 604A based on the measurement metric of the CLI measurement signal being greater than the value. The first UE 604A can also determine that the second UE 604B is more than a distance from the first UE 604A based on the measurement metric of the CLI measurement signal not being greater than the value. For example, when an RSRP, RSRQ, or RSSI of the CLI measurement signal received from the second UE 604B is relatively high (such as greater than the value), the second UE 604B is very likely to be relatively close (such as within the distance of) to the first UE 604A. Conversely, when the RSRP, RSRQ, or RSSI of the CLI measurement signal received from the second UE 604B is relatively low (such as less than the value), the second UE 604B is very likely to be relatively far (such as more than the distance away) from the first UE 604A.

Once established, the sidelink connection between the first UE 604A and the second UE 604B can be used for any number of suitable functions or purposes. For example, in some instances, the first UE 604A can use the sidelink connection as a relay connection over which the first UE 604A can transmit data to and/or receive data from the base station 602 using the second UE 604B as a relay or proxy device. In this way, establishment of the sidelink connection with the second UE 604B can effectively extend the coverage area provided by the base station 602 for the first UE 604A. For example, as depicted in FIG. 5B, the second UE 504B can relay communications between the base station 502 and the first UE 504A (which is outside the coverage area of the base station 502) over the sidelink connection.

Figure 6B:
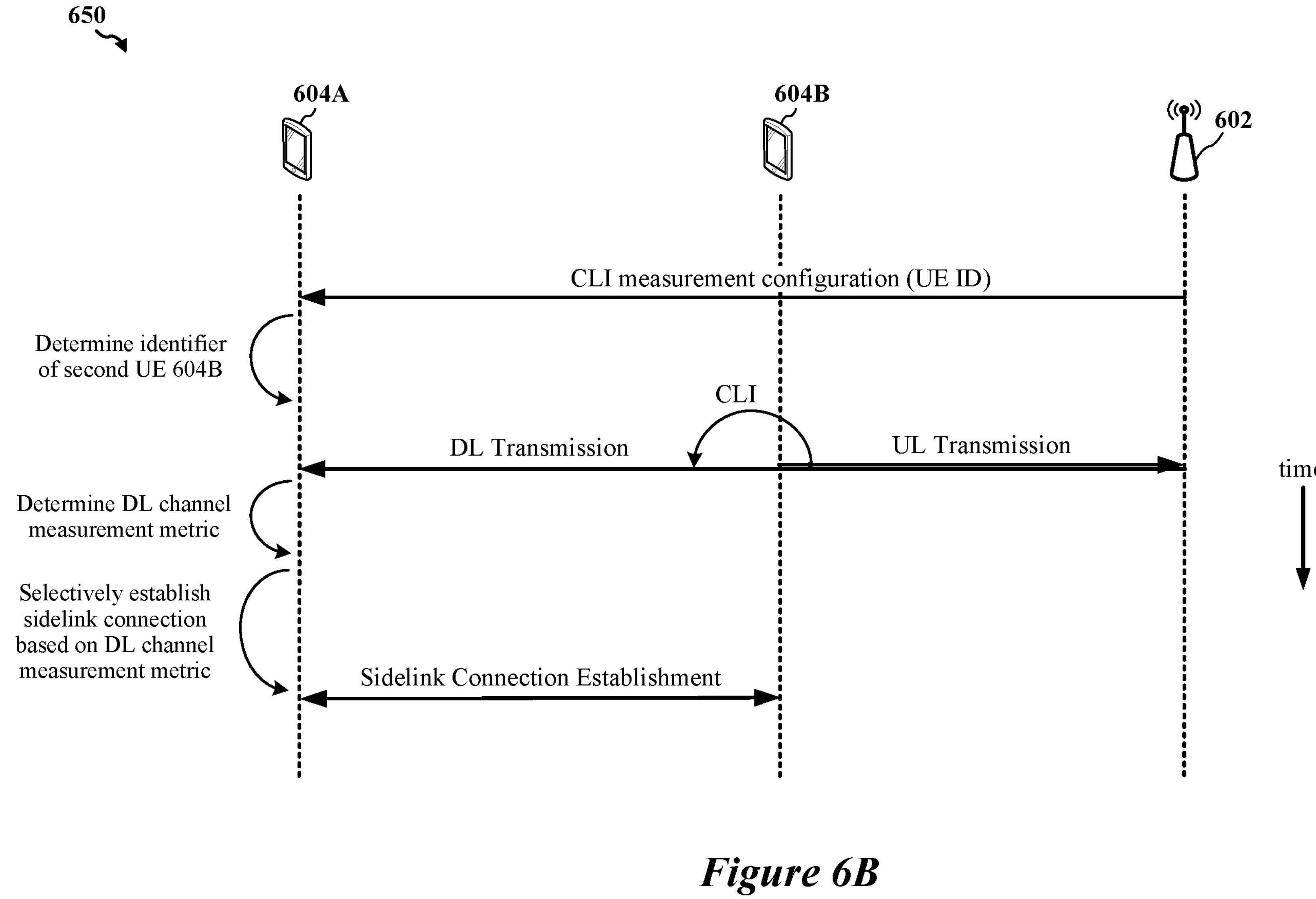
FIG. 6B shows a sequence diagram for wireless communication that supports establishing sidelink channels, according to some other implementations.

FIG. 6B shows a sequence diagram 650 depicting an example message exchange between the base station 602, the first UE 604A, and the second UE 604B that supports establishing sidelink channels, according to some other implementations. The message exchange of FIG. 6B can be used by the first UE 604A to selectively establish a sidelink connection with the second UE 604B based on a presence of CLI on a DL channel or transmission.

The first UE 604A receives a CLI measurement configuration carrying an identifier that uniquely identifies the second UE 604B for one or more CLI measurement procedures. As discussed, the CLI measurement configuration can also indicate the CLI measurement resources on which the second UE 604B transmits CLI measurement signals, and on which the first UE 604A measures the CLI resulting from UL transmissions from the second UE 604B. The second UE 604B can identify the CLI measurement resources from the CLI measurement configuration, or from other suitable signaling.

The first UE 604A determines the identifier of the second UE 604B, which as discussed can be used to address messages and signals to the second UE 604B. The first UE 604A receives a DL transmission from the base station 602 on a DL channel. The first UE 604A detects a presence of CLI on the DL channel caused by UL transmissions from the second UE 604B. The DL channel can be any suitable physical or logical access channel (such as the PDSCH). The UL transmissions can include signals transmitted by the second UE 604B according to the CLI measurement configuration, as described with reference to the sequence diagram 600 of FIG. 6A. In some instances, the UL transmissions can carry one or more reference signals from which measurement metrics can be determined.

The first UE 604A determines one or more dedicated resources associated with the second UE 604B based at least in part on the determined identifier. As discussed, the identifier can be any suitable identifier or value with which the first UE 604A can address messages or signals to the second UE 604B. In some instances, the identifier can be a UE ID. In addition, or in the alternative, the CLI measurement configuration can carry a mapping between the UE ID and the C-RNTI, TMSI, IMSI, or MAC address assigned to or otherwise associated with the second UE 604B.

The first UE 604A can use the identifier determined from the CLI measurement configuration to establish a sidelink connection with the second UE 604B on the one or more dedicated resources. In some implementations, the first UE 604A establishes the sidelink connection with the second UE 604B when a measurement metric of the DL channel is less than a value, and does not establish (or refrains from establishing) the sidelink connection with the second UE 604B when the measurement metric of the DL channel is not less than the value. As discussed, the measurement metric can be one or more of an RSRP, an RSRQ, an RSSI, an SNR, or an SINR of the CLI measurement signal. Selection or determination of the value can ensure that the signal strength, signal quality, and/or channel conditions of the sidelink connection to be established with the second UE 604B provides better coverage, higher throughput, lower latencies, and/or greater signal quality than the UL channel between the first UE 604A and the base station 602.

In other implementations, the first UE 604A establishes the sidelink connection with the second UE 604B when the power consumption associated with transmitting data to the second UE 604B over the sidelink connection is less than the power consumption associated with transmitting data to the base station 602 (on an UL access channel) by at least a value. The first UE 604A can refrain from establishing the sidelink connection with the second UE 604B when the power consumption associated with transmitting data to the second UE 604B is not less than the power consumption associated with transmitting data to the base station 602 by at least the value. Selection or determination of the value can ensure that the signal strength, signal quality, and/or channel conditions of the sidelink connection to be established with the second UE 604B provides better coverage, higher throughput, lower latencies, and/or greater signal quality than the UL channel between the first UE 604A and the base station 602.

Figure 7:
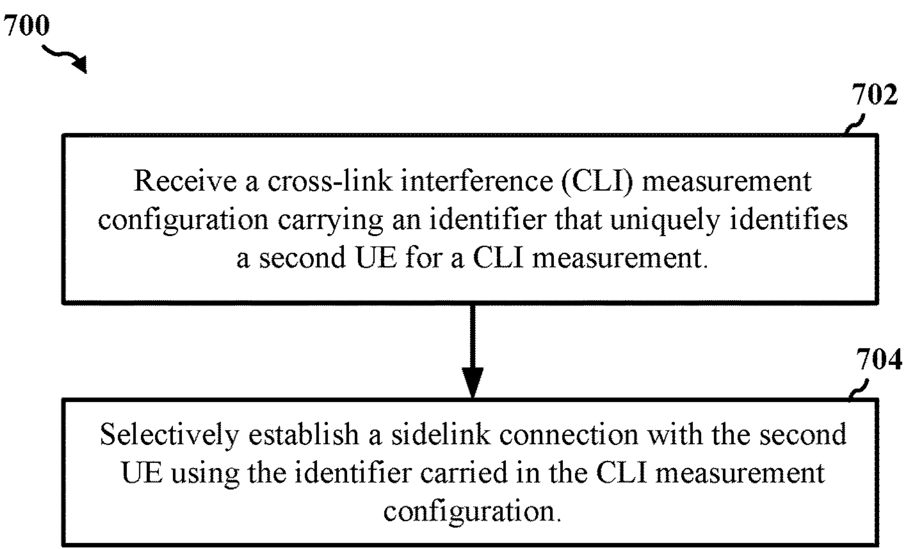
FIG. 7 shows a flowchart depicting an example operation for wireless communication that supports establishing sidelink channels, according to some implementations.

FIG. 7 shows a flowchart depicting an example operation 700 for wireless communication that supports establishing sidelink channels, according to some implementations. The operation 700 may be performed by a wireless communication device such as the UE 104 of FIG. 1, the UE 350 of FIG. 3, the first UE 504A of FIGS. 5A and 5B, or the first UE 604A of FIGS. 6A and 6B. Although described with reference to the first UE 604A, the operation 700 may be performed by other suitable wireless communication devices in conjunction with other suitable UEs, base stations, access nodes, TRPs, or network entities.

At block 702, the first UE 604A receives a cross-link interference (CLI) measurement configuration carrying an identifier that uniquely identifies a second UE for a CLI measurement. At block 704, the first UE 604A selectively establishes a sidelink connection with the second UE 604B using the identifier carried in the CLI measurement configuration. In some instances, the CLI measurement configuration may be received via a radio resource controller (RRC) configuration. In some other instances, the CLI measurement configuration may be received in a DL message such as, for example, a downlink control information (DCI) message.

The identifier may be any suitable identifier, address, or value with which the first UE 604A can address messages or signals to the second UE 604B for establishing a sidelink connection. In some implementations, the identifier may be a user equipment identifier (UE ID). In some instances, the CLI measurement configuration may carry a mapping between the UE ID and at least one of a cell radio network temporary identifier (C-RNTI), a temporary mobile station identifier (TMSI), an international mobile subscriber identity (IMSI), or a medium access control (MAC) address assigned to the second UE 604B. The CLI measurement configuration may also indicate one or more CLI measurement resources on which the first UE 604A is to measure the CLI associated with UL transmissions from the second UE 604B.

Figure 8:
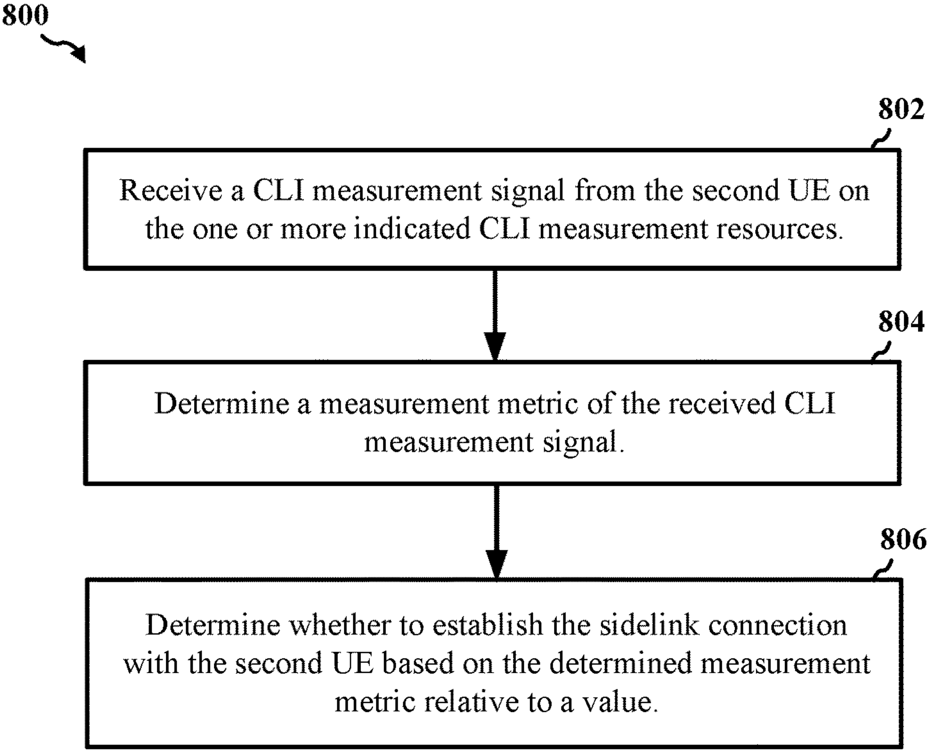
FIG. 8 shows a flowchart depicting an example operation for wireless communication that supports establishing sidelink channels, according to some implementations.

FIG. 8 shows a flowchart depicting an example operation 800 for wireless communication that supports establishing sidelink channels, according to some implementations. The operation 800 may be performed by a wireless communication device such as the UE 104 of FIG. 1, the UE 350 of FIG. 3, the first UE 504A of FIGS. 5A and 5B, or the first UE 604A of FIGS. 6A and 6B. Although described with reference to the first UE 604A, the operation 800 may be performed by other suitable wireless communication devices in conjunction with other suitable UEs, base stations, access nodes, TRPs, or network entities.

In some implementations, the operation 800 may be one example of selectively establishing the sidelink connection in block 704 of FIG. 7. For example, at block 802, the first UE 604A receives a CLI measurement signal from the second UE 604B on the one or more indicated CLI measurement resources. At block 804, the first UE 604A determines a measurement metric of the received CLI measurement signal. At block 806, the first UE 604A determines whether to establish the sidelink connection with the second UE 604B based on the determined measurement metric relative to a value.

The CLI measurement signal may be received according to the CLI measurement configuration. In some instances, the CLI measurement configuration may indicate one or more of a periodicity, an offset, a number of RBs, or a number of OFDM symbols corresponding to the CLI measurement resources over which the second UE 604B transmits the CLI measurement signal.

The measurement metric may be any suitable metric, value, or characteristic from which the first UE 604A can determine the strength or quality of the CLI measurement signal transmitted by the second UE 604B. In some instances, the measurement metric may be an RSRP or an RSRQ, and the reference signal may be an SRS, a DMRS, or a CSI-RS. For example, in some implementations, the CLI measurement configuration may indicate a reference signal received power-type measurement CLI procedure, and the CLI measurement signal may include one or more sets of SRS resources or DM-RS resources. In other instances, the measurement metric may be a received power measurement such as an RSSI of the CLI measurement signal. In some other instances, the measurement metric may be an interference measurement such as an SNR or an SINR.

Figure 9:
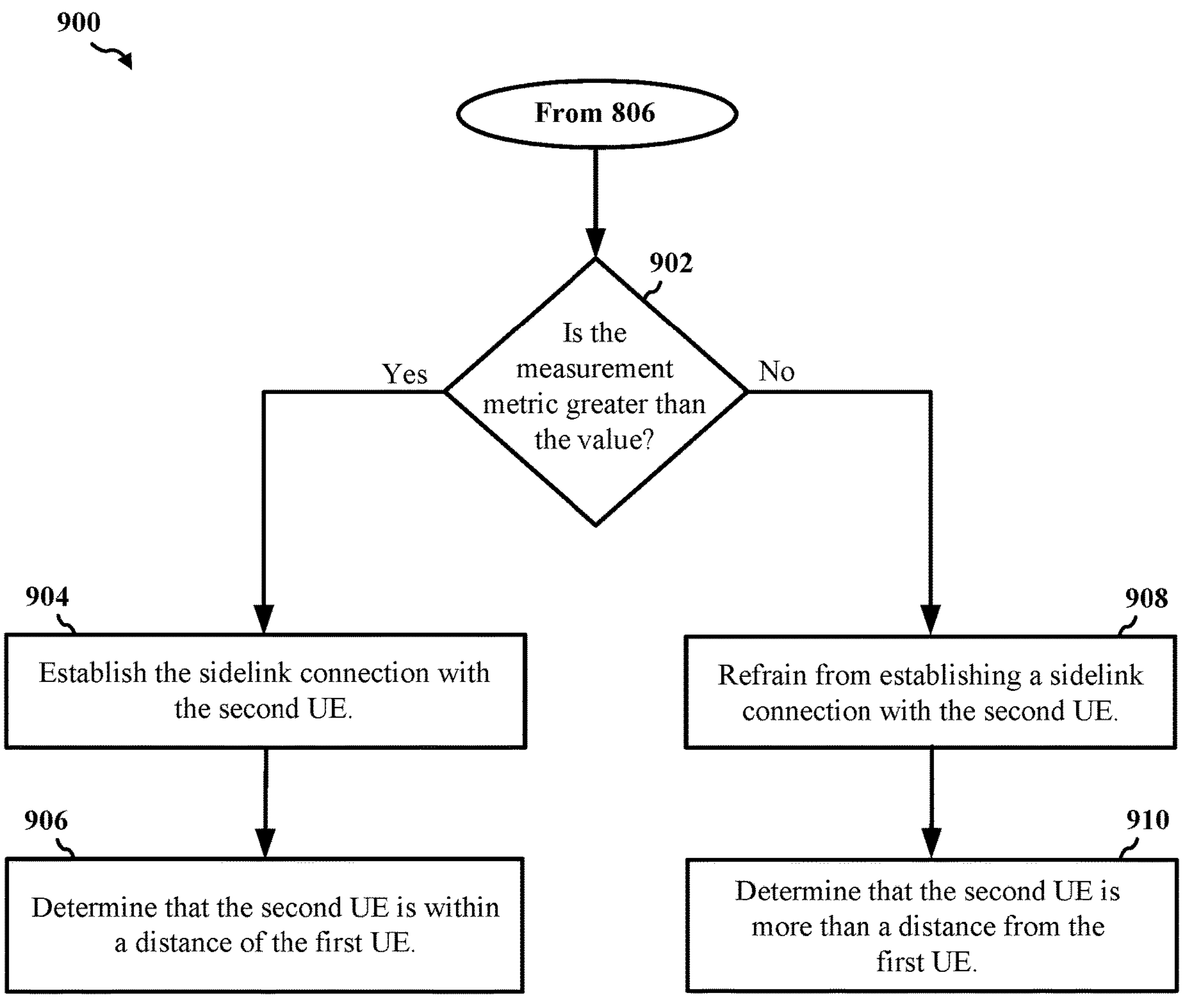
FIG. 9 shows a flowchart depicting an example operation for wireless communication that support establishing sidelink channels, according to some implementations.

FIG. 9 shows a flowchart depicting an example operation 900 for wireless communication that supports establishing sidelink channels, according to some implementations. The operation 900 may be performed by a wireless communication device such as the UE 104 of FIG. 1, the UE 350 of FIG. 3, the first UE 504A of FIGS. 5A and 5B, or the first UE 604A of FIGS. 6A and 6B. Although described with reference to the first UE 604A, the operation 900 may be performed by other suitable wireless communication devices in conjunction with other suitable UEs, base stations, access nodes, TRPs, or network entities.

In some implementations, the operation 900 may be one example of determining whether to establish the sidelink connection in block 806 of FIG. 8. For example, at block 902, the first UE 604A determines whether the measurement metric of the received CLI measurement signal is greater than the value. If the measurement metric is greater than the value, then at block 904 the first UE 604A establishes the sidelink connection with the second UE 604B. In some instances, the first UE 604A may, at block 906, determine that the second UE 604B is within a distance of the first UE 604A based on the determined CLI measurement metric being greater than the value. Conversely, if the measurement metric is not greater than the value, the first UE 604A may, at block 908, refrain from establishing the sidelink connection with the second UE. In some instances, the first UE 604A may, at block 910, determine that the second UE 604B is more than a distance from the first UE 604A based on the determined CLI measurement metric not being greater than the value.

Figure 10:
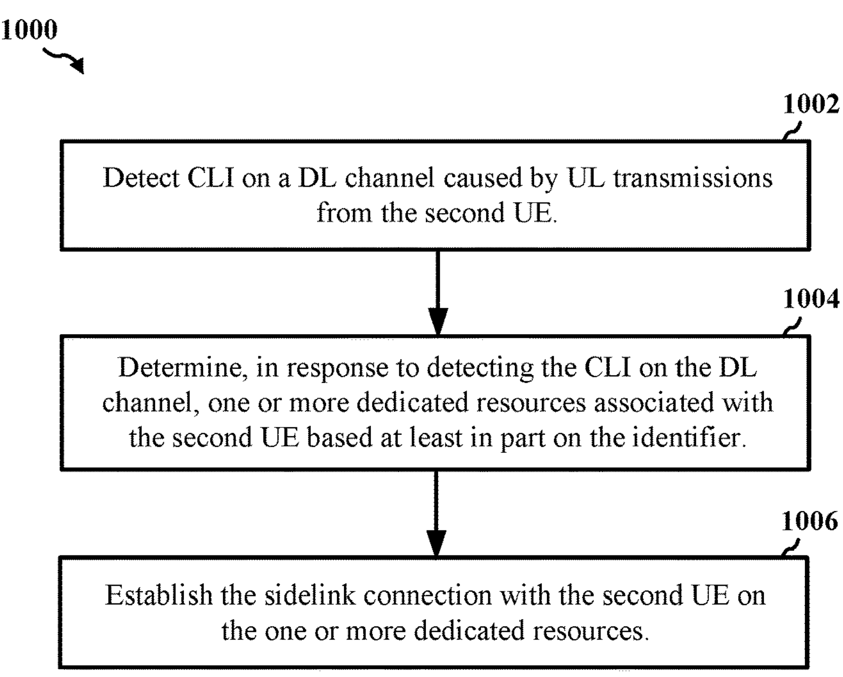
FIG. 10 shows a flowchart depicting an example operation for wireless communication that support establishing sidelink channels, according to some implementations.

FIG. 10 shows a flowchart depicting an example operation 1000 for wireless communication that supports establishing sidelink channels, according to some implementations. The operation 1000 may be performed by a wireless communication device such as the UE 104 of FIG. 1, the UE 350 of FIG. 3, the first UE 504A of FIGS. 5A and 5B, or the first UE 604A of FIGS. 6A and 6B. Although described with reference to the first UE 604A, the operation 1000 may be performed by other suitable wireless communication devices in conjunction with other suitable UEs, base stations, access nodes, TRPs, or network entities.

In some implementations, the operation 1000 may be another example of selectively establishing the sidelink connection in block 704 of FIG. 7. For example, at block 1002, the first UE 604A detects CLI on a downlink (DL) channel caused by uplink (UL) transmissions from the second UE 604B. At block 1004, the first UE 604A determines, in response to detecting the CLI on the DL channel, one or more dedicated resources associated with the second UE 604B based at least in part on the identifier. At block 1006, the first UE 604A establishes the sidelink connection with the second UE 604B on the one or more dedicated resources.

In some instances, detecting a presence of CLI on the DL channel may trigger the first UE 604A to establish the sidelink connection with the second UE 604B. In some other instances, the first UE 604A may establish the sidelink connection with the second UE 604B based on a measurement metric of the DL channel or a transmission power consumption metric of the first UE 604A (or both), for example, as described with reference to FIGS. 11 and 12.

Figure 11:
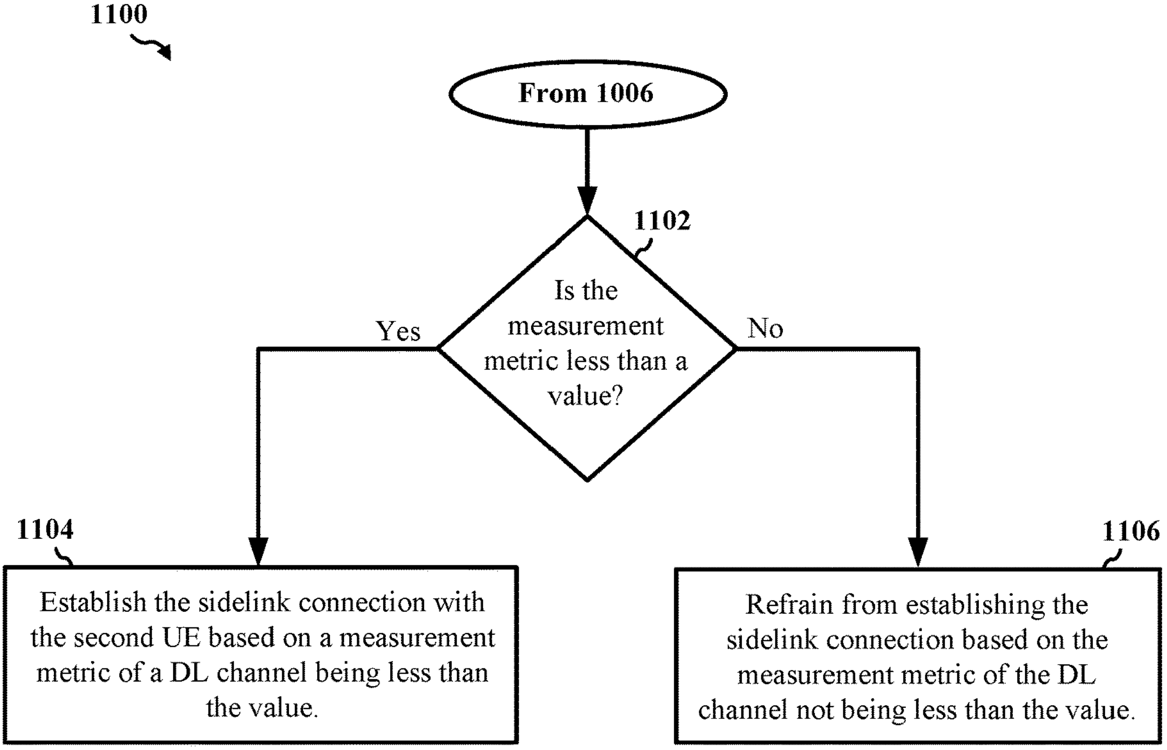
FIG. 11 shows a flowchart depicting an example operation for wireless communication that support establishing sidelink channels, according to some implementations.

FIG. 11 shows a flowchart depicting an example operation 1100 for wireless communication that supports establishing sidelink channels, according to some implementations. The operation 1100 may be performed by a wireless communication device such as the UE 104 of FIG. 1, the UE 350 of FIG. 3, the first UE 504A of FIGS. 5A and 5B, or the first UE 604A of FIGS. 6A and 6B. Although described with reference to the first UE 604A, the operation 1100 may be performed by other suitable wireless communication devices in conjunction with other suitable UEs, base stations, access nodes, TRPs, or network entities.

In some implementations, the operation 1100 may be one example of establishing the sidelink connection in block 1006 of FIG. 10. For example, at block 1102, the first UE 604A determines whether a measurement metric of the DL channel is less than a value. If the DL channel measurement metric is less than the value, the first UE 604A may, at block 1104, establish the sidelink connection with the second UE. Conversely, if the DL channel measurement metric is not less than the value, the first UE 604A may, at block 1106, refrain from establishing the sidelink connection with the second UE. The measurement metric of the DL channel may be an RSRP or a RSRQ of a DL reference signal, an RSSI value of the DL transmission, or an SNR or SINR of the DL channel. In some instances, the DL channel may be a physical downlink shared channel (PDSCH). In other instances, the DL channel may be a physical downlink control channel (PDCCH).

Figure 12:
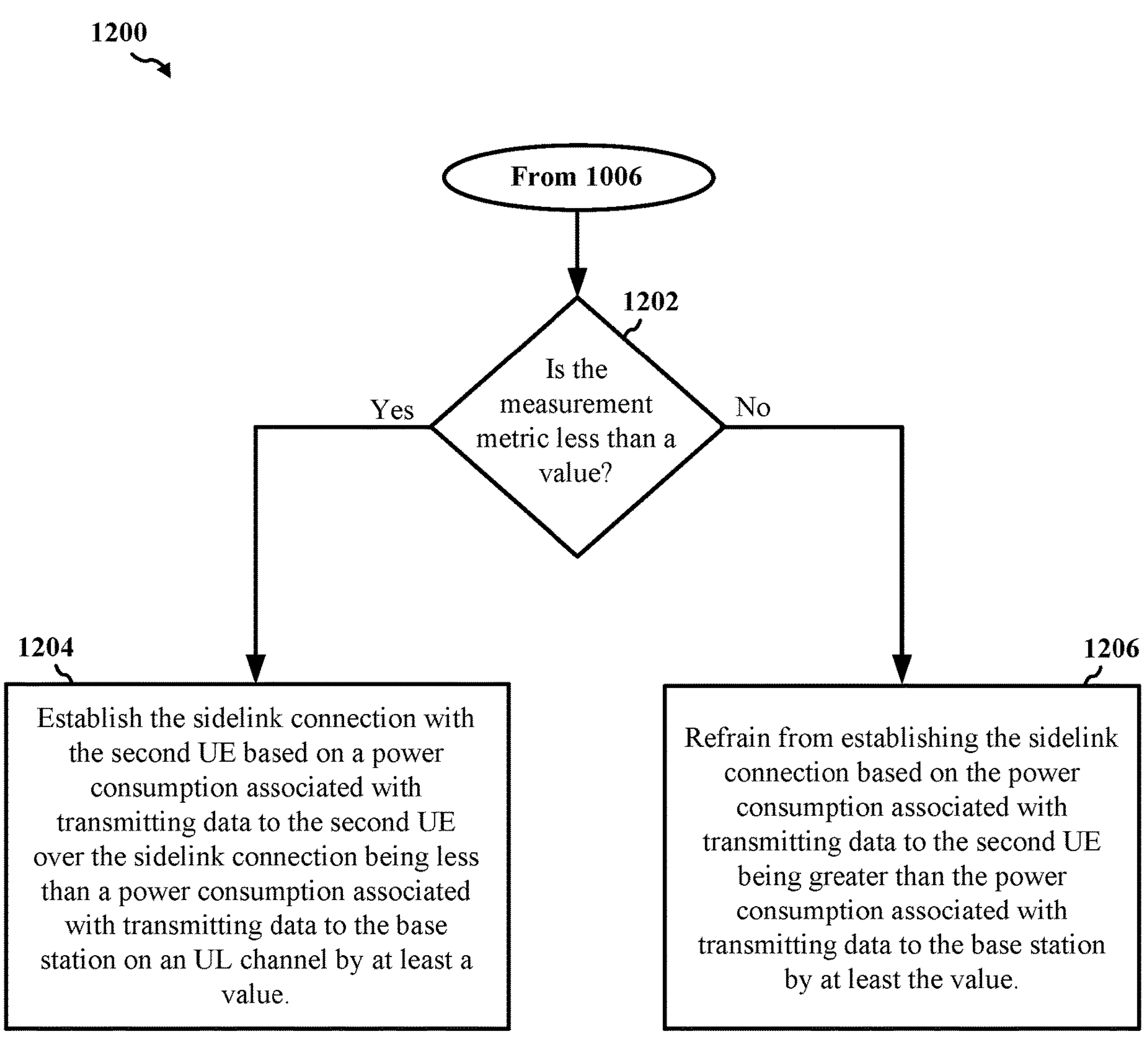
FIG. 12 shows a flowchart depicting an example operation for wireless communication that support establishing sidelink channels, according to some implementations.

FIG. 12 shows a flowchart depicting an example operation 1200 for wireless communication that supports establishing sidelink channels, according to some implementations. The operation 1200 may be performed by a wireless communication device such as the UE 104 of FIG. 1, the UE 350 of FIG. 3, the first UE 504A of FIGS. 5A and 5B, or the first UE 604A of FIGS. 6A and 6B. Although described with reference to the first UE of FIG. 6, the operation 1200 may be performed by other suitable wireless communication devices in conjunction with other suitable UEs, base stations, access nodes, TRPs, or network entities.

In some implementations, the operation 1200 may be another example of establishing the sidelink connection in block 1006 of FIG. 10. For example, at block 1202, the first UE 604A determines whether a power consumption associated with transmitting data to the second UE 604B over the sidelink connection is less than a power consumption associated with transmitting data to the base station on an UL channel by at least a value. If the power consumption associated with data transmissions to the second UE 604B is less than the power consumption associated with data transmissions to the base station by at least the value, the first UE 604A may, at block 1204, establish the sidelink connection with the second UE 604B. Conversely, if the power consumption associated with data transmissions to the second UE 604B is not less than the power consumption associated with data transmissions to the base station by at least the value, the first UE 604A may, at block 1206, refrain from establishing the sidelink connection with the second UE 604B.

Figure 13:
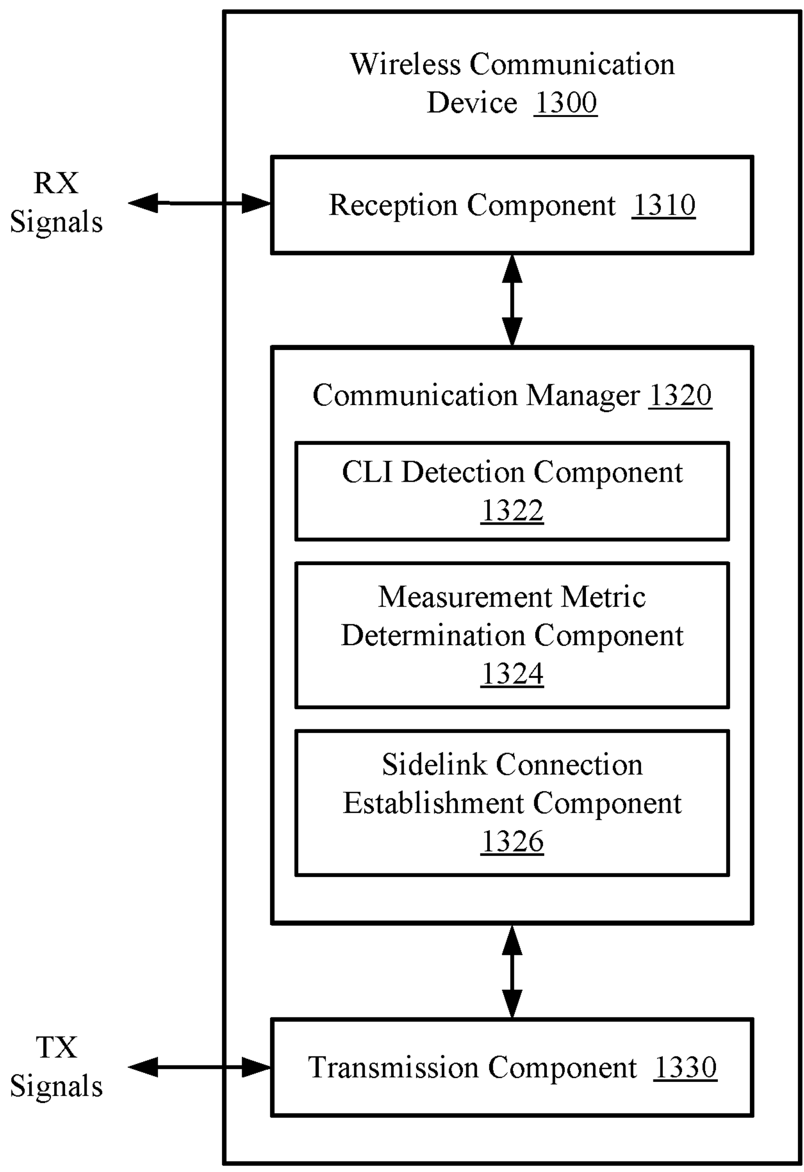
FIG. 13 shows a block diagram of an example wireless communication device, according to some implementations.

FIG. 13 shows a block diagram of an example wireless communication device 1300, according to some implementations. The wireless communication device 1300 may be any suitable device capable of transmitting or receiving wireless signals according to one or more versions, releases, or amendments to a wireless communications standard or protocol. In some implementations, the wireless communication device 1300 may be one example of the UE 104 of FIG. 1, the UE 350 of FIG. 3, the first UE 504A of FIGS. 5A and 5B, or the first UE 604A of FIGS. 6A and 6B. For example, the wireless communication device 1300 can be a chip, SoC, chipset, package or device that includes at least one processor and at least one modem (for example, a cellular modem).

The wireless communication device 1300 includes a reception component 1310, a communication manager 1320, and a transmission component 1330. The communication manager 1320 can include a CLI detection component 1322, a measurement metric determination component 1324, and a sidelink connection component 1326. Portions of one or more of the components 1322, 1324, and 1326 can be implemented at least in part in hardware or firmware. In some implementations, at least one of the components 1322, 1324, or 1326 is implemented at least in part as software stored in a memory (such as the memory 360). For example, portions of one or more of the components 1322, 1324, and 1326 can be implemented as non-transitory instructions or code executable by a processor (such as the processor 359) to perform the functions or operations of the respective component.

The reception component 1310 is configured to receive CLI measurement configurations, CLI measurement signals, DL transmissions, reference signals, sidelink connection establishment messages, or other suitable signaling associated with the wireless communications system 100 of FIG. 1. The communication manager 1320 is configured to selectively establish a sidelink connection with another second UE using the identifier carried in the CLI measurement configuration. The measurement metric determination component 1324 can be used to measure one or more measurement metrics such as, for example, a reference signal received power (RSRP), a reference signal received quality (RSRQ), a received signal strength indicator (RSSI), a signal to noise ratio (SNR), or a signal to interference plus noise ratio (SINR). The sidelink connection establishment component 1326 can be configured to establish the sidelink connection with the other UE. The TX signals can include (but are not limited to) UL transmissions to a base station, or peer-to-peer transmissions on a sidelink connection or channel.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The following are further examples of the innovative aspects included in this disclosure:

1. A method for wireless communication performed by a first user equipment (UE), comprising:
   receiving a cross-link interference (CLI) measurement configuration carrying an identifier that uniquely identifies a second UE for a CLI measurement; and
   selectively establishing a sidelink connection with the second UE using the identifier carried in the CLI measurement configuration.
2. The method of example 1, wherein the CLI measurement configuration is received via a radio resource controller (RRC) configuration.
3. The method of any of the preceding examples, wherein the identifier comprises a user equipment identifier (UE ID).
4. The method of any of the preceding examples, wherein the CLI measurement configuration carries a mapping between the UE ID and at least one of a cell radio network temporary identifier (C-RNTI), a temporary mobile station identifier (TMSI), an international mobile subscriber identity (IMSI), or a medium access control (MAC) address.
5. The method of any of the preceding examples, wherein the CLI measurement configuration indicates one or more CLI measurement resources on which to measure the CLI associated with uplink (UL) transmissions from the second UE.
6. The method of any of the preceding examples, wherein selectively establishing the sidelink connection comprises:
   receiving a CLI measurement signal from the second UE on the one or more indicated CLI measurement resources;
   determining a measurement metric of the received CLI measurement signal; and
   determining whether to establish the sidelink connection with the second UE based on the determined measurement metric of the received CLI measurement signal relative to a value.
7. The method of any of the preceding examples, wherein the measurement metric comprises at least one of a reference signal received power (RSRP), a reference signal received quality (RSRQ), a received signal strength indicator (RSSI), a signal to noise ratio (SNR), or a signal to interference plus noise ratio (SINR).
8. The method of any of the preceding examples, wherein the CLI measurement configuration further indicates one or more of a periodicity, an offset, a number of resource blocks (RBs), or a number of orthogonal frequency-division multiplexing (OFDM) symbols corresponding to transmission of the CLI measurement signal on the one or more indicated CLI measurement resources.
9. The method of any of the preceding examples, wherein the CLI measurement signal is received according to the CLI measurement configuration.
10. The method of any of the preceding examples, wherein the CLI measurement signal comprises one of a sounding reference signal (SRS), an uplink demodulation reference signal (DM-RS), or a channel state information (CSI) reference signal (CSI-RS).
11. The method of any of the preceding examples, wherein the CLI measurement configuration indicates a reference signal received power-type measurement CLI procedure, and the CLI measurement signal comprises one or more sets of sounding reference signal (SRS) resources or demodulation reference signal (DM-RS) resources.
12. The method of any of the preceding examples, wherein the CLI measurement configuration identifies the one or more sets of SRS resources or DMRS resources.
13. The method of any of the preceding examples, wherein the determined measurement metric is indicative of a proximity of the first UE to the second UE.
14. The method of any of the preceding examples, wherein determining whether to establish the sidelink connection comprises:
   establishing the sidelink connection with the second UE based on the determined measurement metric of the received CLI measurement signal being greater than a value.
15. The method of any of the preceding examples, further comprising:
   determining that the second UE is within a distance of the first UE based on the determined measurement metric being greater than the value.
16. The method of any of the preceding examples, wherein determining whether to establish the sidelink connection comprises:
   refraining from establishing the sidelink connection with the second UE based on the determined measurement metric of the received CLI measurement signal being less than a value.
17. The method of any of the preceding examples, further comprising: determining that the second UE is more than a distance from the first UE based on the determined measurement metric being less than the value.
18. The method of any of the preceding examples, wherein selectively establishing the sidelink connection comprises:
   detecting CLI on a downlink (DL) channel caused by uplink (UL) transmissions from the second UE;
   in response to detecting the CLI on the DL channel, determining one or more dedicated resources associated with the second UE based at least in part on the identifier; and
   establishing the sidelink connection with the second UE on the one or more dedicated resources.
19. The method of any of the preceding examples, wherein establishing the sidelink connection further comprises:
   establishing the sidelink connection with the second UE on the one or more dedicated resources based on a measurement metric of the DL channel being less than a value; or
   refraining from establishing the sidelink connection with the second UE based on the measurement metric of the DL channel being greater than the value.
20. The method of any of the preceding examples, wherein the measurement metric comprises at least one of a reference signal received power (RSRP), a reference signal received quality (RSRQ), a received signal strength indicator (RSSI), a signal to noise ratio (SNR), or a signal to interference plus noise ratio (SINR).
21. The method of any of the preceding examples, wherein establishing the sidelink connection further comprises:
   establishing the sidelink connection with the second UE on the one or more dedicated resources based on a power consumption associated with transmitting data to the second UE over the sidelink connection being less than a power consumption associated with transmitting data to the base station on an UL channel by at least a value; or refraining from establishing the sidelink connection with the second UE based on the power consumption associated with transmitting data to the second UE over the sidelink connection not being less than the power consumption associated with transmitting data to the base station on the UL channel by at least the value.

22. The method of any of the preceding examples, wherein the identifier is based at least in part on correlations between the identifier and one or more operating parameters of the dedicated resource or channel.

23. A first user equipment (UE) comprising: at least one modem;

at least one processor communicatively coupled with the at least one modem; and at least one memory communicatively coupled with the at least one processor and storing instructions that, when executed by the at least one processor in conjunction with the at least one modem, causes the first UE to perform operations comprising:

receive a cross-link interference (CLI) measurement configuration carrying an identifier that uniquely identifies a second UE for a CLI measurement; and selectively establish a sidelink connection with the second UE using the identifier carried in the CLI measurement configuration.

24. The first UE of example 23, wherein the CLI measurement configuration is received via radio resource controller (RRC) configuration.

25. The first UE of any of the preceding examples 23-24, wherein the identifier comprises a user equipment identifier (UE ID).

26. The first UE of any of the preceding examples 23-25, wherein the CLI measurement configuration carries a mapping between the UE ID and at least one of a cell radio network temporary identifier (C-RNTI), a temporary mobile station identifier (TMSI), an international mobile subscriber identity (IMSI), or a medium access control (MAC) address.

27. The first UE of any of the preceding examples 23-26, wherein the CLI measurement configuration indicates one or more CLI measurement resources on which to measure the CLI associated with uplink (UL) transmissions from the second UE.

28. The first UE of any of the preceding examples 23-27, wherein execution of the instructions for establishing the sidelink connection causes the first UE to:

receive a CLI measurement signal from the second UE on the one or more indicated CLI measurement resources;

determine a measurement metric of the received CLI measurement signal; and determine whether to establish the sidelink connection with the second UE based on the determined measurement metric of the received CLI measurement signal relative to a value.

29. The first UE of any of the preceding examples 23-28, wherein the measurement metric comprises at least one of a reference signal received power (RSRP), a reference signal received quality (RSRQ), a received signal strength indicator (RSSI), a signal to noise ratio (SNR), or a signal to interference plus noise ratio (SINR).

30. The first UE of any of the preceding examples 23-29, wherein the CLI measurement configuration further indicates one or more of a periodicity, an offset, a number of resource blocks (RBs), or a number of orthogonal frequency-division multiplexing (OFDM) symbols corresponding to transmission of the CLI measurement signal on the one or more indicated CLI measurement resources.

31. The first UE of any of the preceding examples 23-30, wherein the CLI measurement signal is received according to the CLI measurement configuration.

32. The first UE of any of the preceding examples 23-31, wherein the CLI measurement signal comprises one of a sounding reference signal (SRS), an uplink demodulation reference signal (DM-RS), or a channel state information (CSI) reference signal (CSI-RS).

33. The first UE of any of the preceding examples 23-32, wherein the CLI measurement configuration indicates a reference signal received power-type measurement CLI procedure, and the CLI measurement signal comprises one or more sets of sounding reference signal (SRS) resources or demodulation reference signal (DM-RS) resources.

34. The first UE of any of the preceding examples 23-33, wherein the CLI measurement configuration identifies the one or more sets of SRS resources or DMRS resources.

35. The first UE of any of the preceding examples 23-34, wherein the determined measurement metric is indicative of a proximity of the first UE to the second UE.

36. The first UE of any of the preceding examples 23-35, wherein execution of the instructions for determining whether to establish the sidelink connection causes the first UE to:

establish the sidelink connection with the second UE based on the determined measurement metric of the received CLI measurement signal being greater than a value.

37. The first UE of any of the preceding examples 23-36, wherein execution of the instructions causes the first UE to perform operations further comprising:

determining that the second UE is within a distance of the first UE based on the determined measurement metric being greater than the value.

38. The first UE of any of the preceding examples 23-37, wherein execution of the instructions for determining whether to establish the sidelink connection further causes the first UE to:

refrain from establishing the sidelink connection with the second UE based on the determined measurement metric of the received CLI measurement signal being less than a value.

39. The first UE of any of the preceding examples 23-38, wherein execution of the instructions causes the first UE to perform operations further comprising:

determining that the second UE is more than a distance from the first UE based on the determined measurement metric being less than the value.

40. The first UE of any of the preceding examples 23-39, wherein execution of the instructions for selectively establishing the sidelink connection causes the first UE to:

detect CLI on a downlink (DL) channel caused by uplink (UL) transmissions from the second UE;

in response to detecting the CLI on the DL channel, determine one or more dedicated resources associated with the second UE based at least in part on the identifier; and establish the sidelink connection with the second UE on the one or more dedicated resources.

41. The first UE of any of the preceding examples 23-40, wherein execution of the instructions for establishing the sidelink connection causes the first UE to:

establish the sidelink connection with the second UE on the one or more dedicated resources based on a measurement metric of the DL channel being less than a value; or refrain from establishing the sidelink connection with the second UE based on the measurement metric of the DL channel being greater than the value.

42. The first UE of any of the preceding examples 23-41, wherein the measurement metric comprises at least one of a reference signal received power (RSRP), a reference signal received quality (RSRQ), a received signal strength indicator (RSSI), a signal to noise ratio (SNR), or a signal to interference plus noise ratio (SINR).

43. The first UE of any of the preceding examples 23-42, wherein execution of the instructions for establishing the sidelink connection causes the first UE to:

establish the sidelink connection with the second UE on the one or more dedicated resources based on a power consumption associated with transmitting data to the second UE over the sidelink connection being less than a power consumption associated with transmitting data to the base station on an UL channel by at least a value; or refrain from establishing the sidelink connection with the second UE based on the power consumption associated with transmitting data to the second UE over the sidelink connection not being less than the power consumption associated with transmitting data to the base station on the UL channel by at least the value.

44. The first UE of any of the preceding examples 23-43, wherein the identifier is based at least in part on correlations between the identifier and one or more operating parameters of the dedicated resource or channel.

45. A first user equipment (UE), comprising:

means for receiving a cross-link interference (CLI) measurement configuration carrying an identifier that uniquely identifies a second UE for a CLI measurement; and means for selectively establishing a sidelink connection with the second UE using the identifier carried in the CLI measurement configuration.

46. The first UE of example 45, wherein the CLI measurement configuration is received via radio resource controller (RRC) configuration.

47. The first UE of any of the preceding examples 45-46, wherein the identifier comprises a user equipment identifier (UE ID).

48. The first UE of any of the preceding examples 45-47, wherein the CLI measurement configuration carries a mapping between the UE ID and at least one of a cell radio network temporary identifier (C-RNTI), a temporary mobile station identifier (TMSI), an international mobile subscriber identity (IMSI), or a medium access control (MAC) address.

49. The first UE of any of the preceding examples 45-48, wherein the CLI measurement configuration indicates one or more CLI measurement resources on which to measure the CLI associated with uplink (UL) transmissions from the second UE.

50. The first UE of any of the preceding examples 45-49, wherein the means for selectively establishing the sidelink connection is to:

receive a CLI measurement signal from the second UE on the one or more indicated CLI measurement resources;

determine a measurement metric of the received CLI measurement signal; and determine whether to establish the sidelink connection with the second UE based on the determined measurement metric of the received CLI measurement signal relative to a value.

51. The first UE of any of the preceding examples 45-50, wherein the measurement metric comprises at least one of a reference signal received power (RSRP), a reference signal received quality (RSRQ), a received signal strength indicator (RSSI), a signal to noise ratio (SNR), or a signal to interference plus noise ratio (SINR).

52. The first UE of any of the preceding examples 45-51, wherein the CLI measurement configuration further indicates one or more of a periodicity, an offset, a number of resource blocks (RBs), or a number of orthogonal frequency-division multiplexing (OFDM) symbols corresponding to transmission of the CLI measurement signal on the one or more indicated CLI measurement resources.

53. The first UE of any of the preceding examples 45-52, wherein the CLI measurement signal is received according to the CLI measurement configuration.

54. The first UE of any of the preceding examples 45-53, wherein the CLI measurement signal comprises one of a sounding reference signal (SRS), an uplink demodulation reference signal (DM-RS), or a channel state information (CSI) reference signal (CSI-RS).

55. The first UE of any of the preceding examples 45-54, wherein the CLI measurement configuration indicates a reference signal received power-type measurement CLI procedure, and the CLI measurement signal comprises one or more sets of sounding reference signal (SRS) resources or demodulation reference signal (DM-RS) resources.

56. The first UE of any of the preceding examples 45-55, wherein the CLI measurement configuration identifies the one or more sets of SRS resources or DMRS resources.

57. The first UE of any of the preceding examples 45-56, wherein the determined measurement metric is indicative of a proximity of the first UE to the second UE.

58. The first UE of any of the preceding examples 45-57, wherein the means for determining whether to establish the sidelink connection is to:

establish the sidelink connection with the second UE based on the determined measurement metric of the received CLI measurement signal being greater than a value.

59. The first UE of any of the preceding examples 45-58, further comprising:

means for determining that the second UE is within a distance of the first UE based on the determined measurement metric being greater than the value.

60. The first UE of any of the preceding examples 45-59, wherein the means for determining whether to establish the sidelink connection is to:

refrain from establishing the sidelink connection with the second UE based on the determined measurement metric of the received CLI measurement signal being less than a value.

61. The first UE of any of the preceding examples 45-60, further comprising:

means for determining that the second UE is more than a distance from the first UE based on the determined measurement metric being less than the value.

62. The first UE of any of the preceding examples 45-61, wherein the means for selectively establishing the sidelink connection is to:

detect CLI on a downlink (DL) channel caused by uplink (UL) transmissions from the second UE;

in response to detecting the CLI on the DL channel, determine one or more dedicated resources associated with the second UE based at least in part on the identifier; and establish the sidelink connection with the second UE on the one or more dedicated resources.

63. The first UE of any of the preceding examples 45-62, wherein the means for establishing the sidelink connection further is to:

establish the sidelink connection with the second UE on the one or more dedicated resources based on a measurement metric of the DL channel being less than a value; or refrain from establishing the sidelink connection with the second UE based on the measurement metric of the DL channel being greater than the value.

64. The first UE of any of the preceding examples 45-63, wherein the measurement metric comprises at least one of a reference signal received power (RSRP), a reference signal received quality (RSRQ), a received signal strength indicator (RSSI), a signal to noise ratio (SNR), or a signal to interference plus noise ratio (SINR).

65. The first UE of any of the preceding examples 45-64, wherein the means for establishing the sidelink connection further is to:

establish the sidelink connection with the second UE on the one or more dedicated resources based on a power consumption associated with transmitting data to the second UE over the sidelink connection being less than a power consumption associated with transmitting data to the base station on an UL channel by at least a value; or refrain from establishing the sidelink connection with the second UE based on the power consumption associated with transmitting data to the second UE over the sidelink connection not being less than the power consumption associated with transmitting data to the base station on the UL channel by at least the value.

66. The first UE of any of the preceding examples 45-65, wherein the identifier is based at least in part on correlations between the identifier and one or more operating parameters of the dedicated resource or channel.

The invention claimed is:

1. A first user equipment (UE) comprising:

at least one modem;

at least one processor; and at least one memory storing instructions, wherein the at least one processor is configured to execute the instructions to cause the first UE to:

receive, via the at least one modem, a cross-link interference (CLI) measurement configuration carrying an identifier that uniquely identifies a second UE; and selectively establish a sidelink connection with the second UE using the identifier carried in the CLI measurement configuration.

2. The first UE of claim 1, wherein the CLI measurement configuration is received via radio resource controller (RRC) configuration.

3. The first UE of claim 1, wherein the identifier comprises a user equipment identifier (UE ID).

4. The first UE of claim 3, wherein the CLI measurement configuration carries a mapping between the UE ID and at least one of a cell radio network temporary identifier (C-RNTI), a temporary mobile station identifier (TMSI), an international mobile subscriber identity (IMSI), or a medium access control (MAC) address.

5. The first UE of claim 1, wherein the CLI measurement configuration indicates one or more CLI measurement resources via which to measure the CLI associated with uplink (UL) transmissions from the second UE.

6. The first UE of claim 5, wherein to establish the sidelink connection, the at least one processor is configured to cause the first UE to:

receive a CLI measurement signal from the second UE via the one or more indicated CLI measurement resources;

determine a measurement metric of the received CLI measurement signal; and determine whether to establish the sidelink connection with the second UE based on the determined measurement metric of the received CLI measurement signal relative to a value.

7. The first UE of claim 6, wherein the measurement metric comprises at least one of a reference signal received power (RSRP), a reference signal received quality (RSRQ), a received signal strength indicator (RSSI), a signal to noise ratio (SNR), or a signal to interference plus noise ratio (SINR).

8. The first UE of claim 6, wherein the CLI measurement configuration further indicates one or more of a periodicity, an offset, a number of resource blocks (RBs), or a number of orthogonal frequency-division multiplexing (OFDM) symbols corresponding to transmission of the CLI measurement signal via the one or more indicated CLI measurement resources.

9. The first UE of claim 6, wherein the CLI measurement signal is received according to the CLI measurement configuration, or the CLI measurement signal comprises one of a sounding reference signal (SRS), a demodulation reference signal (DM-RS), or a channel state information (CSI) reference signal (CSI-RS).

10. The first UE of claim 6, wherein the CLI measurement configuration indicates a reference signal received power-type measurement CLI procedure, and the CLI measurement signal comprises one or more sets of sounding reference signal (SRS) resources or demodulation reference signal (DM-RS) resources.

11. The first UE of claim 10, wherein the CLI measurement configuration identifies the one or more sets of SRS resources or DMRS resources.

12. The first UE of claim 6, wherein the determined measurement metric is indicative of a proximity of the first UE to the second UE.

13. The first UE of claim 6, wherein to determine whether to establish the sidelink connection, the at least one processor is configured to cause the first UE to:

establish the sidelink connection with the second UE based on the determined measurement metric of the received CLI measurement signal being greater than a value.

14. The first UE of claim 13, wherein the at least one processor is further configured to cause causes the first UE to:

determine that the second UE is within a distance of the first UE based on the determined measurement metric being greater than the value.

15. The first UE of claim 6, wherein to determine whether to establish the sidelink connection, the at least one processor is configured to cause the first UE to:

refrain from establishing the sidelink connection with the second UE based on the determined measurement metric of the received CLI measurement signal being less than a value.

16. The first UE of claim 15, wherein the at least one processor is configured to cause causes the first UE to:

determine that the second UE is more than a distance from the first UE based on the determined measurement metric being less than the value.

17. The first UE of claim 1, wherein to selectively establish the sidelink connection, the at least one processor is configured to cause the first UE to:

detect CLI via a downlink (DL) channel caused by uplink (UL) transmissions from the second UE;

in response to detecting the CLI via the DL channel, determine one or more dedicated resources associated with the second UE based at least in part on the identifier; and establish the sidelink connection with the second UE via the one or more dedicated resources.

18. The first UE of claim 17, wherein to establish the sidelink connection, the at least one processor is configured to cause causes the first UE to:

establish the sidelink connection with the second UE via the one or more dedicated resources based on a measurement metric of the DL channel being less than a value; or refrain from establishing the sidelink connection with the second UE based on the measurement metric of the DL channel being greater than the value.

19. The first UE of claim 18, wherein to establish the sidelink connection, the at least one processor is configured to cause the first UE to:

establish the sidelink connection with the second UE via the one or more dedicated resources based on a power consumption associated with transmitting data to the second UE over the sidelink connection being less than a power consumption associated with transmitting data to a base station via an UL channel by at least a value; or refrain from establishing the sidelink connection with the second UE based on the power consumption associated with transmitting data to the second UE over the sidelink connection not being less than the power consumption associated with transmitting data to the base station via the UL channel by at least the value.

20. The first UE of claim 18, wherein the identifier is based at least in part on correlations between the identifier and one or more operating parameters of the dedicated resource or channel.

21. A method for wireless communication executed at a wireless unit, the method comprising:

receiving a cross-link interference (CLI) measurement configuration carrying an identifier that uniquely identifies a second UE; and selectively establishing a sidelink connection with the second UE using the identifier carried in the CLI measurement configuration.

22. An apparatus for wireless communication, the apparatus comprising:

means for receiving a cross-link interference (CLI) measurement configuration carrying an identifier that uniquely identifies a second UE; and means for selectively establishing a sidelink connection with the second UE using the identifier carried in the CLI measurement configuration.

* * * * *